United States Patent
Miyasaka

(10) Patent No.: US 9,235,743 B2
(45) Date of Patent: Jan. 12, 2016

(54) IMAGE GENERATING METHOD, INFORMATION PROCESSING METHOD, AND INFORMATION PROCESSING DEVICE

(71) Applicant: FUJITSU LIMITED, Kawasaki-shi, Kanagawa (JP)

(72) Inventor: Takeaki Miyasaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/261,733

(22) Filed: Apr. 25, 2014

(65) Prior Publication Data

US 2014/0231522 A1    Aug. 21, 2014

Related U.S. Application Data

(63) Continuation of application No. PCT/JP2011/074988, filed on Oct. 28, 2011.

(51) Int. Cl.
G06K 7/10 (2006.01)
G06K 7/14 (2006.01)
H04N 1/40 (2006.01)
G06K 1/12 (2006.01)

(52) U.S. Cl.
CPC ............ G06K 7/1439 (2013.01); G06K 1/121 (2013.01); G06K 7/146 (2013.01); G06K 7/1417 (2013.01); H04N 1/40 (2013.01)

(58) Field of Classification Search
USPC .................. 235/462.1, 462.01, 42.09, 462.16
See application file for complete search history.

(56) References Cited

U.S. PATENT DOCUMENTS

| | | | | |
|---|---|---|---|---|
| 5,866,895 A | * | 2/1999 | Fukuda et al. | 235/494 |
| 6,962,450 B2 | * | 11/2005 | Brouhon et al. | 400/76 |
| 2002/0113125 A1 | * | 8/2002 | Schuessler et al. | 235/462.1 |
| 2003/0184797 A1 | | 10/2003 | Hiramoto | |
| 2013/0200144 A1 | * | 8/2013 | Massicot et al. | 235/375 |

FOREIGN PATENT DOCUMENTS

| | | |
|---|---|---|
| JP | 11-265419 | 9/1999 |
| JP | 2003-251863 | 9/2003 |
| JP | 2008-167314 | 7/2008 |
| JP | 2009-272667 | 11/2009 |
| JP | 2011-124999 | 6/2011 |
| WO | WO 02/28655 A1 | 4/2002 |

OTHER PUBLICATIONS

Patent Abstracts of Japan, Publication No. 11-265419, Published Sep. 28, 1999.
Patent Abstracts of Japan, Publication No. 2003-251863, Published Sep. 9, 2003.

(Continued)

Primary Examiner — Ahshik Kim
(74) Attorney, Agent, or Firm — Staas & Halsey LLP

(57) ABSTRACT

An image generating method performed by a computer, includes extracting data corresponding to a first coded image from first image data including the first coded image; generating a second coded image corresponding to the extracted data, wherein a size of a configuration element included in the second coded image is an integral multiple of a dot size of the first image data; and generating second image data indicating an image including an image indicated by the first image data and the generated second coded image.

7 Claims, 27 Drawing Sheets

(56) References Cited

OTHER PUBLICATIONS

Patent Abstracts of Japan, Publication No. 2008-167314, Published Jul. 17, 2008.
Patent Abstracts of Japan, Publication No. 2009-272667, Published Nov. 19, 2009.
Patent Abstracts of Japan, Publication No. 2011-124999, Published Jun. 23, 2011.

International Search Report mailed Jan. 24, 2012 in corresponding International Patent Application No. PCT/JP2011/074988.

* cited by examiner

FIG.8

| | RANGE INFORMATION (DOT) | | | | ARRANGEMENT INFORMATION (DOT) | | | | | | | | |
|---|---|---|---|---|---|---|---|---|---|---|---|---|---|
| | X1 | Y1 | X2 | Y2 | BLACK | WHITE | BLACK | WHITE | BLACK | WHITE | ... | WHITE | BLACK |
| AREA 1 | 120 | 53 | 1820 | 138 | 5 | 17 | 11 | 5 | 17 | 5 | ... | 5 | 5 |
| AREA 2 | 250 | 510 | 1100 | 595 | 11 | 5 | 5 | 17 | 5 | 11 | ... | 11 | 5 |
| AREA 3 | 120 | 1520 | 1820 | 1605 | 5 | 5 | 11 | 17 | 5 | 11 | ... | 17 | 11 |
| ... | ... | ... | ... | ... | ... | ... | ... | ... | ... | ... | ... | ... | ... |

POSTAL BARCODE RULE INFORMATION

EAN128 FORMAT BARCODE RULE INFORMATION

JAN STANDARD FORMAT BARCODE RULE INFORMATION

| ITEM | VALUE (cm) |
|---|---|
| MODULE (1) | 0.26~0.88 |
| MODULE (2) | (0.26~0.88)×2 |
| MODULE (3) | (0.26~0.88)×3 |
| SYMBOL LENGTH (cm) | (0.26~0.88)×113 |
| CHARACTER SET | 0~9 |

FIG.10

| ITEM | VALUE (cm) |
|---|---|
| MODULE (1) | 0.20 |
| MODULE (2) | 0.38 |
| MODULE (3) | 0.55 |
| SYMBOL LENGTH | 21.47 |

FIG.11

| ITEM | VALUE |
|---|---|
| SPECIFICATION | JAN STANDARD |
| RANGE | [100,150]-[250,220] |
| CHARACTER GROUP | 04912345678904 |
| BASIC MODULE WIDTH | 78 (DOT) |
| RESOLUTION | 600 |

FIG.12

| CHARACTER | ARRANGEMENT PATTERN | | | | | | |
|---|---|---|---|---|---|---|---|
| 1 | BLACK (1) | WHITE (2) | BLACK (2) | WHITE (1) | BLACK (1) | | |
| 2 | ... | ... | ... | ... | ... | | |
| .. | .. | .. | .. | .. | .. | | |

122

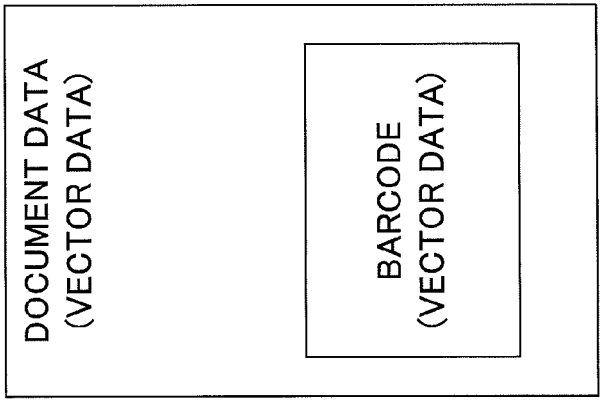
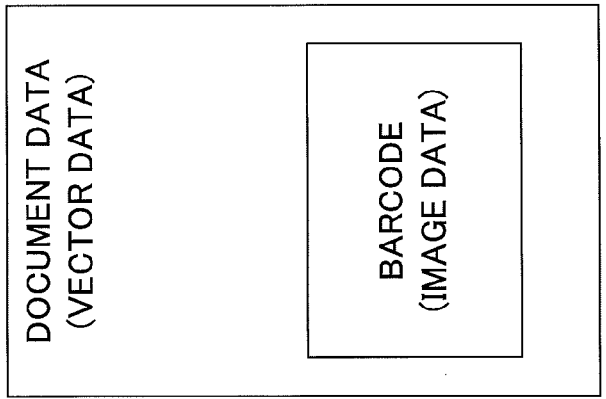
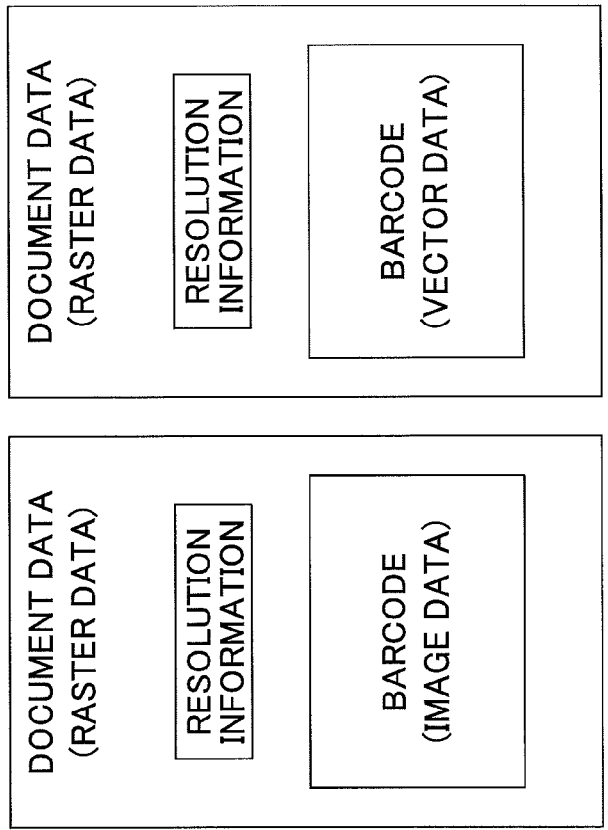

FIG.18

| | POSITION DETECTION PATTERN INFORMATION | | | | | | IMAGE ARRANGEMENT POINTER | IMAGE ARRANGEMENT POINTER [1] | IMAGE ARRANGEMENT POINTER [2] | IMAGE ARRANGEMENT POINTER [3] | |
|---|---|---|---|---|---|---|---|---|---|---|---|
| | X1 | Y1 | X2 | Y2 | X3 | Y3 | | | | | |
| AREA 1 | 130 | 220 | 130 | 305 | 215 | 305 | | | | | .. |
| AREA 2 | 510 | 600 | — | — | — | — | | | | | .. |
| AREA 3 | 305 | 1853 | — | — | — | — | | | | | .. |
| .. | | | | | | | | | | | |

MAXI CODE RULE INFORMATION

QR CODE (MODEL 1) RULE INFORMATION

| VERSION | ITEM | VALUE |
|---|---|---|
| 1 | CELL NUMBER | 21 × 21 CELL |
| | MASK PATTERN | QR-model1[1] |
| 2 | VERSION 2 | 25 × 25 CELL |
| | MASK PATTERN | QR-model1[2] |
| : | : | : |
| 14 | VERSION 14 | 73 × 73 CELL |
| | MASK PATTERN | QR-model1[ ] |
| — | PATTERN INFORMATION | Num0[ ] |

FIG.20

| ITEM | VALUE |
|---|---|
| CELL NUMBER | 21 × 21 |
| CELL SIZE | 3 (DOT) |
| IMAGE ARRANGEMENT POINTER | IMAGE ARRANGEMENT POINTER [1] |

FIG.21

| ITEM | VALUE |
|---|---|
| SPECIFICATION | QR(model1) |
| VERSION | 1(21 × 21) |
| RANGE | [100,150]–[180,230] |
| CHARACTER GROUP | abcdefg012345 |
| CELL SIZE | 4 (DOT) |
| SYMBOL SIZE | 21 × 4 (DOT) |
| QUITE ZONE | 16 (DOT) |
| RESOLUTION | 600 |

FIG.29

| BEFORE CORRECTION | M (DOT) | 2M (DOT) | 3M (DOT) | ... | 5M (DOT) | ... |
|---|---|---|---|---|---|---|
| CORRECTION VALUE | M (DOT) | 2M (DOT) | 3M+1 (DOT) | ... | 5M+1 (DOT) | ... |

123

IMAGE GENERATING METHOD, INFORMATION PROCESSING METHOD, AND INFORMATION PROCESSING DEVICE

CROSS-REFERENCE TO RELATED APPLICATION

This application is a U.S. continuation application filed under 35 USC 111(a) claiming benefit under 35 USC 120 and 365(c) of PCT Application PCT/JP2011/074988 filed on Oct. 28, 2011, the entire contents of which are incorporated herein by reference.

FIELD

The embodiments discussed herein are related to an image generating method, an information processing method, and an information processing device.

BACKGROUND

Document data, which is generated by various application programs (regardless of whether the data is raster data or vector data), is converted by a printer driver into print data corresponding to the printer that is the output destination. When the original document data before conversion is in a data format without the concept of resolution, or when the resolution of the document data before conversion is different from the resolution of the printer that is the output destination, the contents of the print data after conversion may include errors with respect to the contents of the print data before conversion. That is to say, the result obtained by outputting the document data onto paper (hereinafter, "paper document") may include errors with respect to the contents of the original document data before conversion.

Patent Document 1: Japanese Laid-Open Patent Publication No. 2009-272667

When the document data includes a barcode or a two-dimensional code (hereinafter, "barcode, etc."), the above-described errors may also occur in the barcode, etc.

FIG. 1 is a diagram for describing an example of errors at the time of printing a barcode. In FIG. 1, the rectangles B1, B2, B3, B4, B5, and B6 indicate black lines (bars) of a barcode. An input coordinate system is the coordinate system of the barcode included in the document data. An output coordinate system is the coordinate system corresponding to the resolution of the printer that is the output destination. Each grid in the lattice in FIG. 1 expresses one dot in the output coordinate system.

In the input coordinate system, both the left and right sides of the rectangle B2, the right side of the rectangle B4, and both sides of the rectangle B6 do not match the separator lines of the dots. This kind of situation occurs, for example, when the input coordinate system is in units of inches, or when the resolution of the input coordinate system is different from the resolution of the output coordinate system. In this case, the printer driver corrects the width of each rectangle so as to match the output coordinate system. For example, the rectangle B2 and the rectangle B6 are expanded in directions of both sides and corrected to be three dots. Furthermore, the rectangle B4 is contracted in the right direction and corrected to be three dots. By making such mechanical corrections, the barcode after being printed will have errors with respect to the barcode included in the document data.

Furthermore, FIG. 2 is a diagram for describing an example of errors at the time of printing a two-dimensional code. In FIG. 2 also, according to the same principle as that described with reference to FIG. 1, errors may occur between the two-dimensional code in the input coordinate system and the two-dimensional code in the output coordinate system.

The errors illustrated in FIGS. 1 and 2 may affect the operation of reading the barcode, etc. printed on a paper document after being output. That is to say, it may not be possible to correctly read the proper value expressed by the barcode, etc.

SUMMARY

According to an aspect of the embodiments, an image generating method performed by a computer, includes extracting data corresponding to a first coded image from first image data including the first coded image; generating a second coded image corresponding to the extracted data, wherein a size of a configuration element included in the second coded image is an integral multiple of a dot size of the first image data; and generating second image data indicating an image including an image indicated by the first image data and the generated second coded image.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 8 illustrates a configuration example of code area information according to the first embodiment;

FIG. 9 illustrates a configuration example of a rule information storage unit according to the first embodiment;

FIG. 10 is a diagram illustrating a configuration example of barcode configuration information;

FIG. 11 illustrates a configuration example of basic information of a corrected barcode;

FIG. 12 illustrates a configuration example of a pattern information storage unit according to the first embodiment;

FIGS. 15A through 15D illustrate examples of data structures of document data;

FIG. 18 illustrates a configuration example of code area information according to the second embodiment;

FIG. 19 illustrates a configuration example of a rule information storage unit according to the second embodiment;

FIG. 20 illustrates a configuration example of two-dimensional code configuration information;

FIG. 21 illustrates a configuration example of basic information of a corrected two-dimensional code;

FIG. 29 illustrates a configuration example of a correction value storage unit.

DESCRIPTION OF EMBODIMENTS

Figure 1:
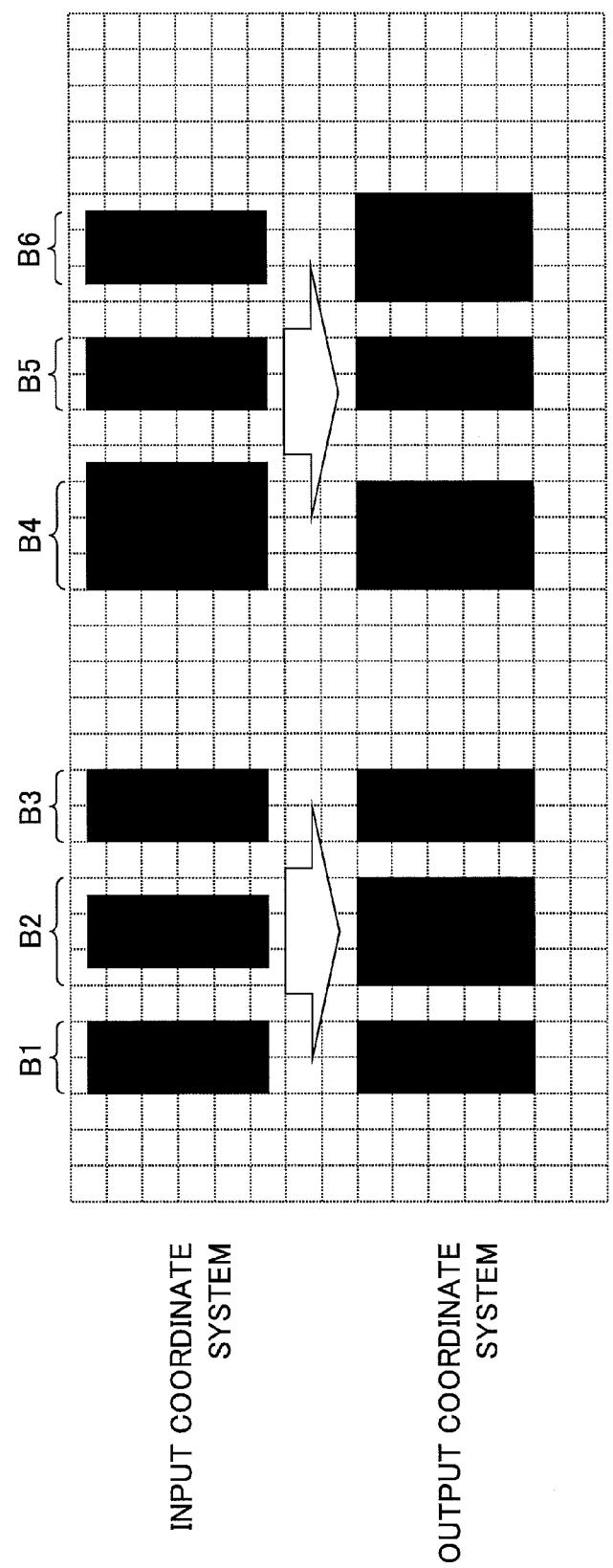
FIG. 1 is a diagram for describing an example of errors at the time of printing a barcode.
Figure 2:
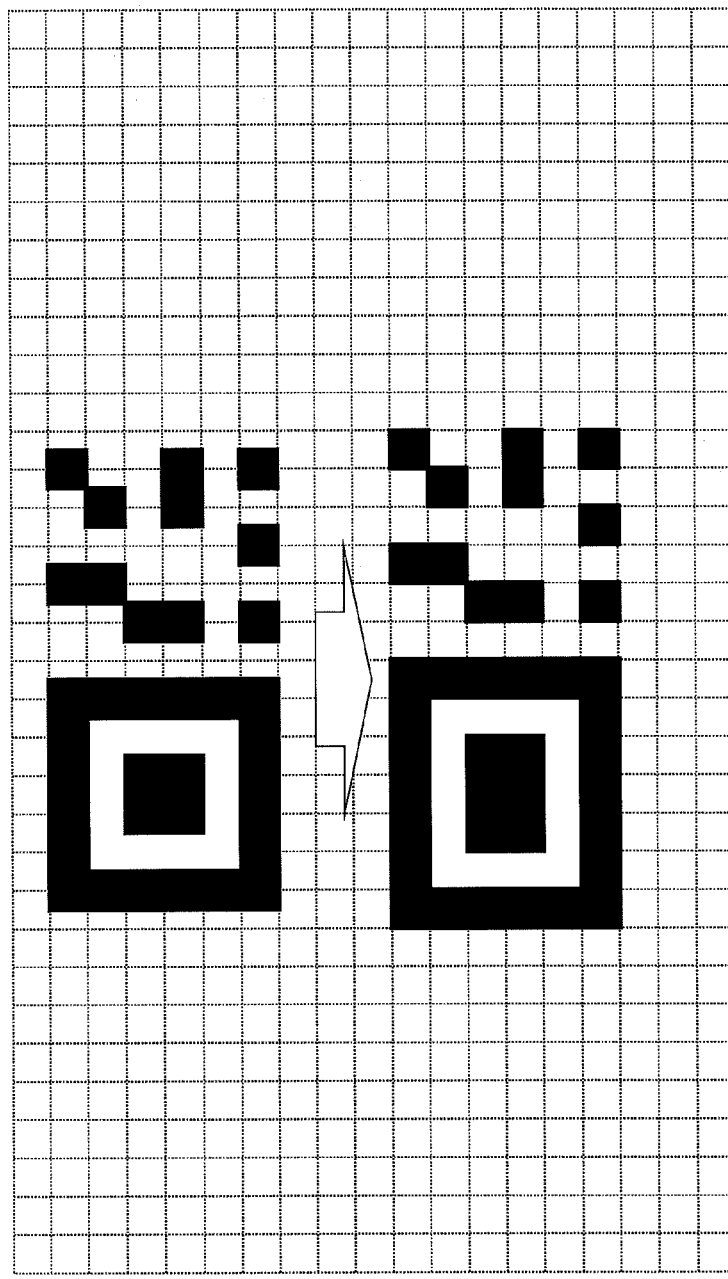
FIG. 2 is a diagram for describing an example of errors at the time of printing a two-dimensional code.
Figure 3:
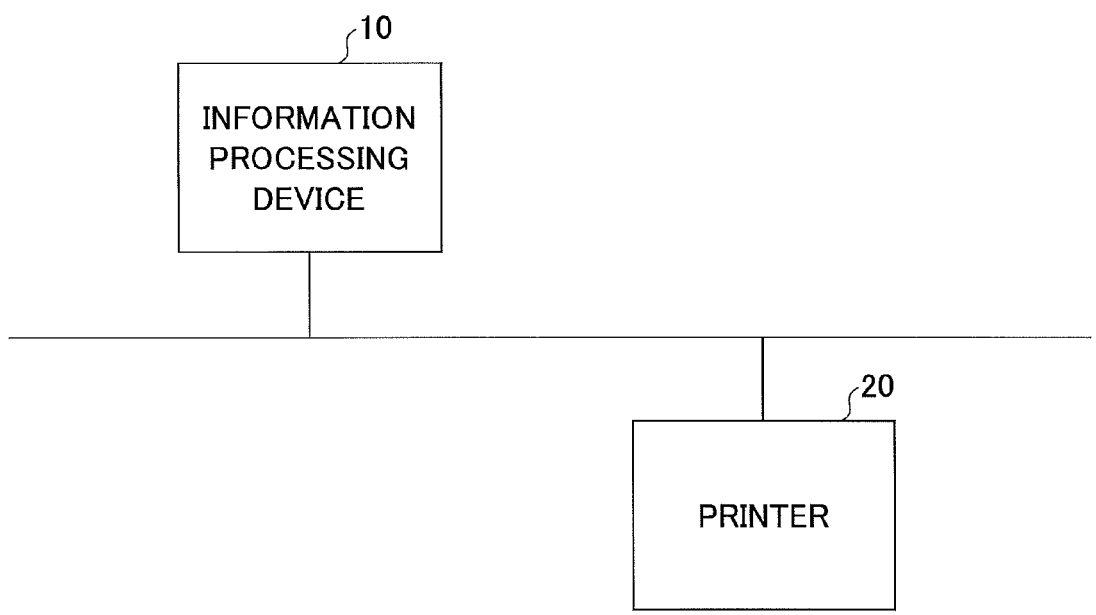
FIG. 3 illustrates a configuration example of an information processing system according to a first embodiment.

Preferred embodiments of the present invention will be explained with reference to accompanying drawings. FIG. 3 illustrates a configuration example of an information processing system according to a first embodiment. In FIG. 3, an information processing device 10 and a printer 20 are connected so that communication is possible, via a network such as a LAN (Local Area Network) or the Internet, etc.

The information processing device 10 is a computer that executes processes such as generating print data of document data including a barcode, which is an example of a coded image. The information processing device 10 sends the generated print data to the printer 20.

The printer 20 prints the print data sent from the information processing device 10, onto print paper.

Figure 4:
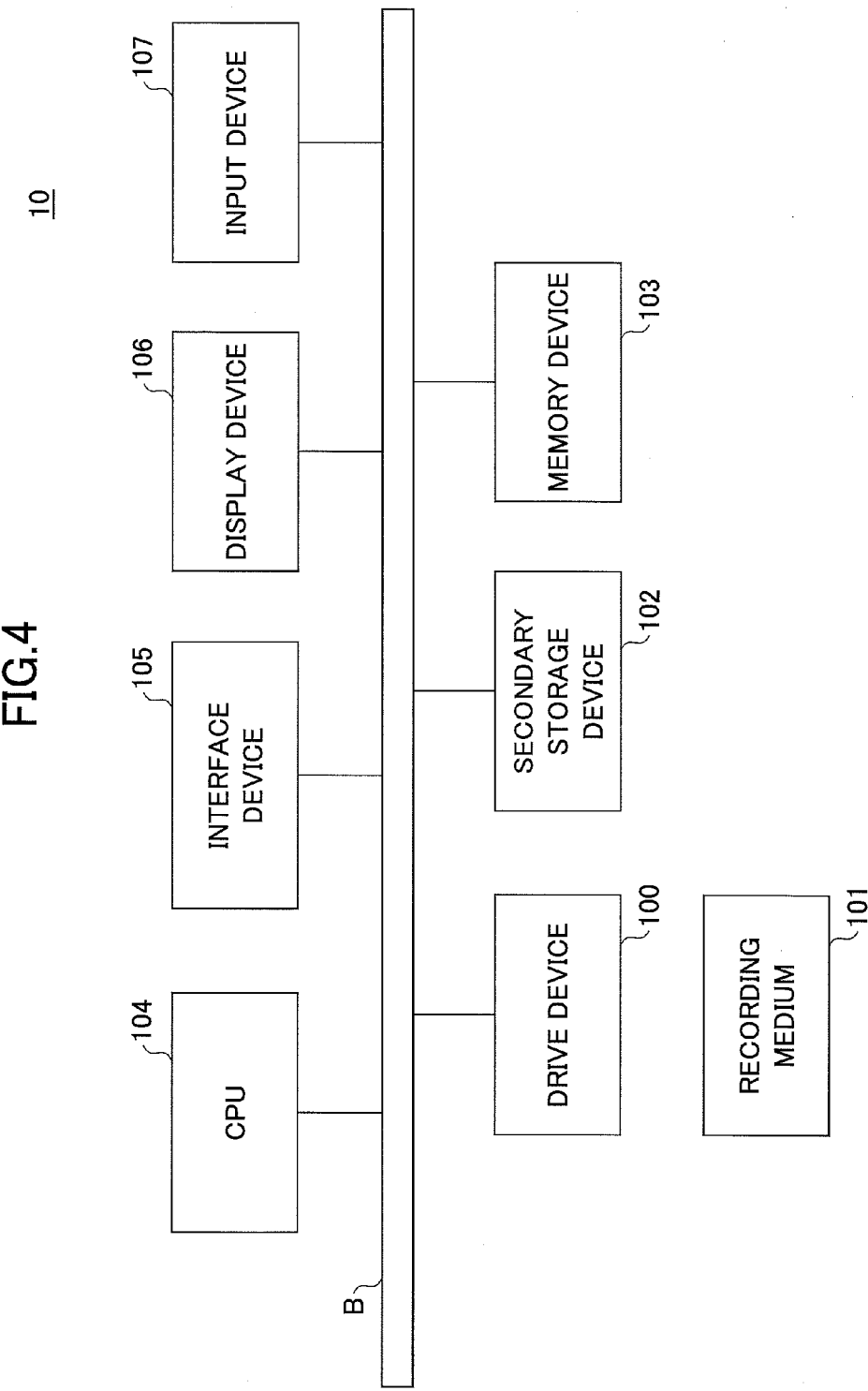
FIG. 4 illustrates a hardware configuration example of an information processing device according to the first embodiment.

FIG. 4 illustrates a hardware configuration example of the information processing device 10 according to the first embodiment. The information processing device 10 illustrated in FIG. 4 includes a drive device 100, a secondary storage device 102, a memory device 103, a CPU 104, an interface device 105, a display device 106, and an input device 107, which are connected to each other via a bus B.

The programs for realizing processes at the information processing device 10 are provided by a recording medium 101. When the recording medium 101 storing a program is set in the drive device 100, the program is installed into the secondary storage device 102 from the recording medium 101 via the drive device 100. However, the program may not always be installed from the recording medium 101; the program may be downloaded from another computer via a network. The secondary storage device 102 stores the installed program as well as files and data that are needed.

The memory device 103 reads a program from the secondary storage device 102 and stores the program, when an instruction to activate a program is given. The CPU 104 realizes functions relevant to the information processing device 10 according to the program stored in the memory device 103. The interface device 105 is used as an interface for connecting to the network. The display device 106 displays a GUI (Graphical User Interface), etc. according to programs. The input device 107 includes a keyboard and a mouse, etc., and is used for inputting various operation instructions.

Note that examples of the recording medium 101 are portable recording media such as a CD-ROM, a DVD disk, or a USB memory. Furthermore, examples of the secondary storage device 102 are a HDD (Hard Disk Drive) and a flash memory. Both the recording medium 101 and the secondary storage device 102 correspond to a computer-readable recording medium.

Figure 5:
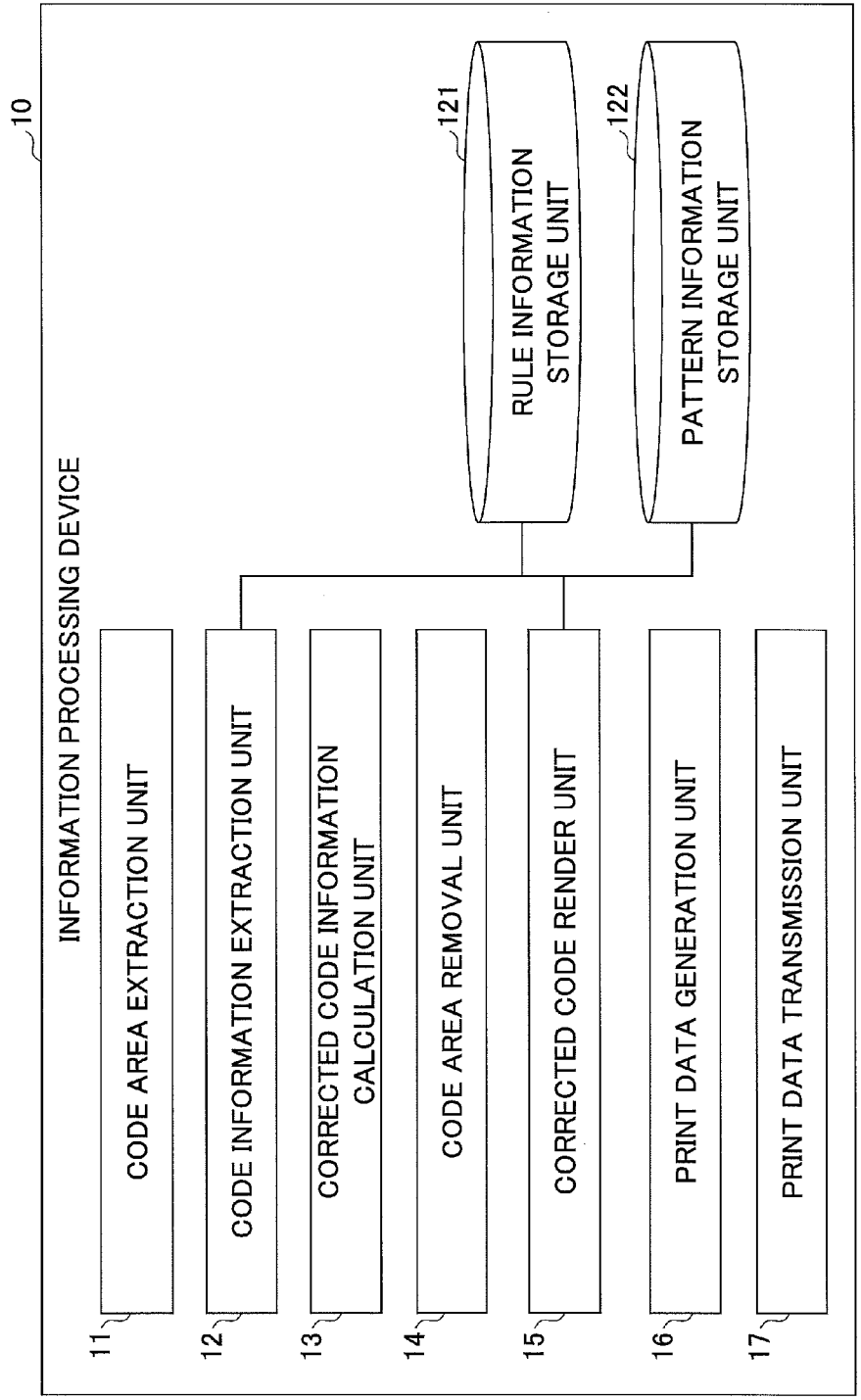
FIG. 5 illustrates a functional configuration example of the information processing device according to the first embodiment.

FIG. 5 illustrates a functional configuration example of the information processing device 10 according to the first embodiment. In FIG. 5, the information processing device 10 includes a code area extraction unit 11, a code information extraction unit 12, a corrected code information calculation unit 13, a code area removal unit 14, a corrected code render unit 15, a print data generation unit 16, and a print data transmission unit 17. These units are realized by processes that the CPU 104 is caused to execute by programs installed in the information processing device 10. Furthermore, the information processing device 10 includes a rule information storage unit 121 and a pattern information storage unit 122. These storage units may be realized by using a storage device connected to the secondary storage device 102 or the information processing device 10 via a network.

The code area extraction unit 11 extracts a rectangular area including a barcode, from the document data that is the print target. The document data is an example of electronic data, and the data format is not limited to a predetermined format. Furthermore, as a matter of convenience, the term "document" is used; however, the render contents of the document data may not be a document. For example, an image may be included, a figure may be included, or the document may be in a format of a form. Note that in this case, as a matter of convenience, it is assumed that the document data is raster data (image data), and that in part of the raster data, one or more barcodes (images of barcodes) are rendered.

The code information extraction unit 12 extracts, from the area extracted by the code area extraction unit 11, configuration information of a barcode, information indicated by the barcode (information embedded in the barcode or information expressed by the barcode), etc. The corrected code information calculation unit 13 calculates the size (width) of a bar constituting the corrected barcode. A corrected barcode is a barcode in which the width etc. of a bar is corrected, so that when the document data is printed by the printer 20, the barcode in the printed state does not include any errors with respect to the information that to be indicated by the barcode.

The code area removal unit 14 removes the barcode rendered in the document data, from the document data. The corrected code render unit 15 renders the corrected barcode in the document data. The print data generation unit 16 generates print data (PDL (Page Description Language) data) corresponding to the printer 20, with respect to the document data. The print data transmission unit 17 sends the print data to the printer 20.

The rule information storage unit 121 stores the rule information (configuration information) of the barcode, for each specification of the barcode. In the rule information of the barcode, the width, etc., of a configuration element (bar) constituting the barcode is specified. The pattern information storage unit 122 stores pattern information for each specification of the barcode. Pattern information is association information associating the arrangement of the bar and characters expressed by the arrangement. Note that an assembly of characters (character group) is information indicated by the barcode.

Figure 6:
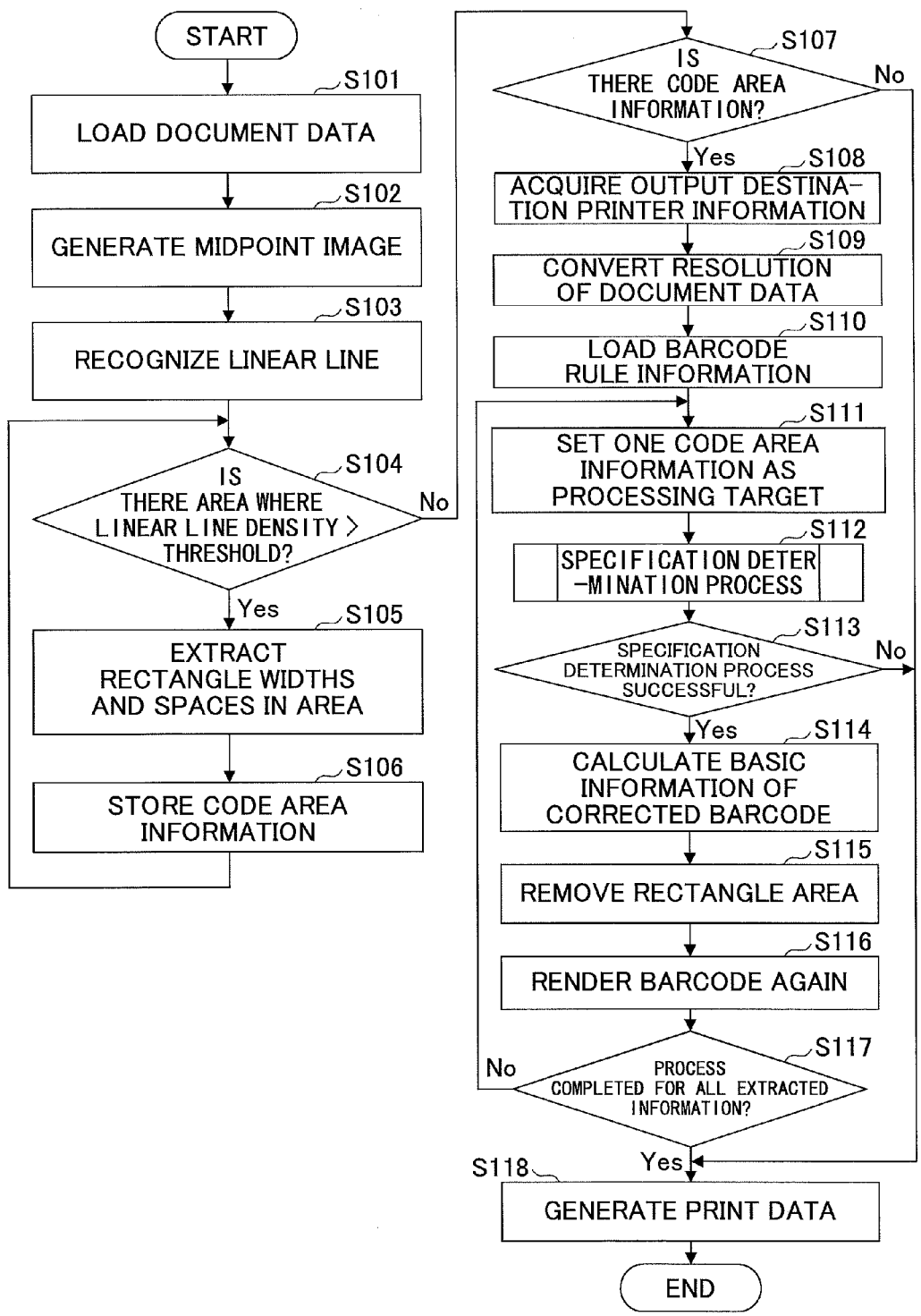
FIG. 6 is a flowchart for describing an example of processing procedures executed by the information processing device according to the first embodiment.

In the following, a description is given of processing procedures executed by the information processing device 10. FIG. 6 is a flowchart for describing an example of processing procedures executed by the information processing device 10 according to the first embodiment.

For example, according to input of an instruction for printing document data stored in the secondary storage device 102, the code area extraction unit 11 loads the document data, which is specified as the target of the print instruction, into the memory device 103 (step S101). Next, the code area extraction unit 11 generates a midpoint image with respect to the document data (step S102). A midpoint image is an image formed by extracting the midpoint of black dots that are continuously arranged in the horizontal direction or the vertical direction of the document data, and using the dot of the extracted midpoint.

Figure 7:
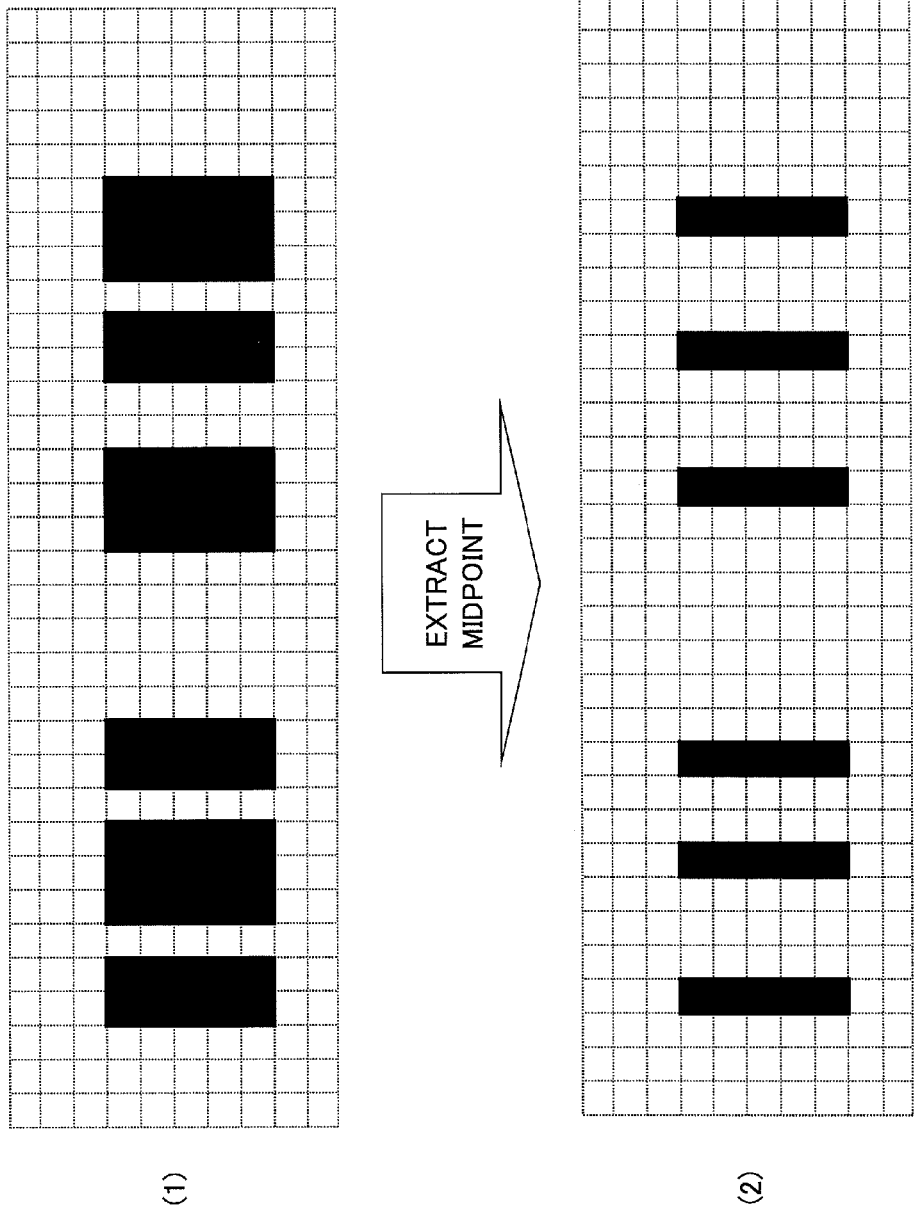
FIG. 7 is a diagram for describing a midpoint image.

FIG. 7 is a diagram for describing a midpoint image. For example, in FIG. 7, assuming that (1) illustrates part of a barcode included in the document data, a midpoint image as illustrated in (2) is extracted with respect to this barcode.

Note that the document data also includes characters, images, figures, etc., other than the barcode; a midpoint is also extracted for such render configuration elements, and the dot corresponding to the extracted midpoint is included in the midpoint image.

Next, the code area extraction unit 11 executes a process of recognizing linear lines, with respect to the midpoint image (step S103). By performing a process of recognizing linear lines, dots relevant to the midpoint image extracted from irregular render elements such as characters, are removed. The midpoint image extracted with respect to the barcode forms linear lines as illustrated in (2) of FIG. 7. Therefore, a midpoint image extracted with respect to a barcode remains without being removed by the process of recognizing linear lines. Note that when the document data is a form, or when the document data includes a table, a midpoint image extracted from the ruled lines of the form or the table also forms a linear line, and thus remains without being removed. In the following description, a midpoint image refers to a midpoint image formed by removing dots other than those of linear lines.

Next, the code area extraction unit 11 determines whether there is an area in the midpoint image where the density of the assembly of linear lines exceeds a threshold (hereinafter, "code area") (step S104). Generally, the density of linear lines extracted from a barcode is higher than the density of an assembly of linear lines extracted from ruled lines. A threshold is to be a value by which the difference between these densities is distinguishable. That is to say, in step S104, it is determined whether there is an area that is highly likely to be a barcode area.

When there is one or more code areas (YES in step S104), the code area extraction unit 11 sets one code area as a processing target (hereinafter, "target area"). The code area extraction unit 11 extracts the width of each of the rectangles and the space between the rectangles included in the target area, in the document data (step S105). In this case, the document data is the processing target; not the midpoint image. For example, in the example of FIG. 7, the width of each of the rectangles and the space between the rectangles are extracted from an image as illustrated in (1).

Next, the code area extraction unit 11 stores the extracted information (hereinafter, "code area information") in the memory device 103 (step S106).

FIG. 8 illustrates a configuration example of code area information according to the first embodiment. In FIG. 8, one item of (one line of) code area information corresponds to one code area, and includes range information and arrangement information.

For example, the range information is a coordinate value (in units of dots (pixels)) indicating the top left vertex (X1, Y1) and the bottom right vertex (X2, Y2) of the code area, in a case where the top left vertex of the document data is (0, 0). The arrangement information is an arrangement of black widths and white widths in the range indicated by the range information. The width of a rectangle extracted in step S105 is stored as a black width. A space between rectangles extracted in step S105 is stored as a white width. Note that the widths are in units of dots.

FIG. 8 illustrates a state where code area information is extracted with respect to three or more code areas; however, immediately after step S106 is executed for the first time, the code area information will be in a state where one code area information item is extracted.

The code area extraction unit 11 executes steps S105 and S106 for all code areas. That is to say, when a plurality of barcodes are included in the document data, steps S105 and S106 are executed for each code area corresponding to each barcode.

When the execution of steps S105 and S106 is completed for all code areas (NO in step S104), the code information extraction unit 12 determines whether code area information is stored in the memory device 103 (step S107). That is to say, it is determined whether the document data includes a code area (an area that is highly likely to be a barcode).

When code area information is not stored in the memory device 103 (NO in step S107), the print data generation unit 16 generates print data (PDL data) corresponding to the printer 20 that is the output destination, with respect to the document data (step S118).

Meanwhile, when one or more items of code area information are stored in the memory device 103 (YES in step S107), the code information extraction unit 12 acquires information of the printer 20 that is the output destination (step S108). Information of the printer 20 that is the output destination is the resolution of the printer 20 that is the output destination. The resolution may be acquired from, for example, the printer driver relevant to the logical printer name selected in the print instruction. Alternatively, the resolution may be stored in the secondary storage device 102 in association with the logical printer name. In this case, the resolution corresponding to the logical printer name selected in the print instruction may be acquired from the secondary storage device 102.

Next, the code information extraction unit 12 converts the resolution of the entire document data into the resolution of the printer 20 that is the output destination (step S109). For example, when the initial resolution of the document data is 400 dpi, and the resolution of the printer 20 that is the output destination is 600 dpi, the document data is converted into data of 600 dpi. In the following description, unless otherwise noted, the document data means the document data after the resolution has been converted. Note that the conversion logic of the resolution of raster data (image data) may conform with known technology.

Next, the code information extraction unit 12 loads the rule information stored in the rule information storage unit 121, into the memory device 103 (step S110).

FIG. 9 illustrates a configuration example of the rule information storage unit 121 according to the first embodiment. As illustrated in FIG. 9, the rule information storage unit 121 stores rule information (configuration information) for each barcode specification (or type). The rule information of each specification includes the width, the symbol length, and the character set for each type of module used in the specification.

A module is one bar (line) constituting the barcode. FIG. 9 illustrates rule information of a JAN (Japanese Article Number) standard format barcode (JAN code). The JAN code has three types of modules (1) through (3). Module (1) is the thinnest bar, and is called the basic module. The configuration elements of the barcode have sizes that are integral multiples of the basic module. Module (2) is a bar having a width that is two times that of the module (1). Module (3) is a bar having a width that is three times that of the module (1). Note that there is a black one and a white one of each module, and therefore the JAN code has six types of modules. According to the arrangement order of the six types of modules, characters are expressed.

The symbol length is the length of the entire barcode. A character set is a set (list) of characters that may be expressed. A JAN code is capable of expressing numbers of zero through nine.

Note that in FIG. 9, the widths and the symbol lengths of the module are in units of centimeters (cm). The number of types of modules, the widths of modules, the symbol length, and the character set, etc., vary according to the specification of the barcode.

Next, the code information extraction unit 12 sets one of the items of the code area information items stored in the memory device 103, as a processing target (step S111). Next, the code information extraction unit 12 executes a specification determination process on the barcode relevant to the code area information that is the processing target (hereinafter, "target code area information") (step S112). By the specification determination process, for example, barcode configuration information as illustrated in FIG. 10 is generated, based on the target code area information.

FIG. 10 is a diagram illustrating a configuration example of barcode configuration information. In FIG. 10, the barcode configuration information includes a width and a symbol length for each module. The symbol length is the length (width) in the horizontal direction of the barcode (from the bar on the left edge to the bar on the right edge). That is to say, in the specification determination process, the number of types of modules constituting the barcode relevant to the target code area information, the width of each module, and the width of the barcode, are calculated.

In the specification determination process, the specification with which the barcode relevant to the target code area information conforms (complies) is determined, based on the barcode configuration information. In the process of determining the specification, information (character group) indicated by the barcode relevant to the target code area information is extracted. Details of the specification determination process are described below.

When the determination of the specification is unsuccessful (NO in step S113), the process proceeds to step S118. Meanwhile, when the determination of the specification is successful, i.e., when the specification with which the barcode relevant to the target code area information conforms is identified, and information (character group) indicated by the barcode is extracted (YES in step S113), the corrected code information calculation unit 13 calculates the basic information of the barcode after correction (corrected barcode), based on processing results of the specification determination process (step S114).

FIG. 11 illustrates a configuration example of the basic information of a corrected barcode. In FIG. 11, the basic information includes a specification, a range, a character group, a basic module width, and a resolution.

The specification is a specification with which the corrected barcode to be generated is to comply. The range includes coordinate values (in units of dots) of the top left vertex and the bottom right vertex of a range in which the corrected barcode is arranged in the document data. The character group is information to be indicated by (expressed by) the corrected barcode. The basic module width is the width (in units of dots) of the thinnest module among the modules constituting the corrected barcode. The resolution is the resolution of the printer 20 that is the output destination.

Among the above items, the values of the specification and the character group are obtained from the processing result of the specification determination process at step S112. Furthermore, as the resolution, the value acquired at step S108 is directly used. Therefore, in step S114, the basic module width and the range are calculated.

The basic module width is calculated from the minimum width (in the case of FIG. 10, the width of module (1)) in the barcode configuration information generated at step S112, the initial resolution of the document data (hereinafter, "initial resolution"), and the resolution of the printer 20 that is the output destination (hereinafter, "output destination resolution"). Specifically, the calculation result (cm) of the minimum width (cm)×(output destination resolution÷initial resolution) is obtained, and this calculation result (cm) is simply converted into a number of dots (dot number) of the output destination resolution, and an integer value (dots) closest to this converted value is used as the basic module width.

Among the coordinate values in the range, the top left vertex is to have coordinate values obtained when the same conversion logic of resolution as that of step S109 is applied, with respect to (X1, Y1) in the range information of the target code area information. The bottom right vertex is to have an X coordinate value obtained by adding the total sum of widths of bars in the corrected barcode to the X coordinate value of the top left vertex, and a Y coordinate value obtained by adding the height of the corrected barcode to the Y coordinate value of the top left vertex. Note that the height of the corrected barcode may be, for example, a value obtained when the same conversion logic of resolution as that of step S109 is applied, with respect to the height of the range information of the target code area information.

Next, the code area removal unit 14 removes render information of a rectangular area indicated by the range of the basic information of the corrected barcode in the document data (step S115). That is to say, the barcode embedded in the document data is removed. Note that the rectangular area that is the removal target may be, for example, extended by several dots outside the rectangular area indicated by the range of the basic information of the corrected barcode. Next, the corrected code render unit 15 renders the corrected barcode in the document data, based on the basic information of the corrected barcode and the pattern information storage unit 122 (step S116).

The rendering of the corrected barcode is performed based on the character group included in the basic information of the corrected barcode and the pattern information storage unit 122.

FIG. 12 illustrates a configuration example of the pattern information storage unit 122 according to the first embodiment. As illustrated in FIG. 12, the pattern information storage unit 122 stores an arrangement pattern of modules for each character. Note that the table illustrated in FIG. 12 is stored for each specification of barcodes. FIG. 12 illustrates an example of a table with respect to a JAN code. The table indicates that the character "1" is expressed by an arrangement pattern including a black module (1), a white module (2), a black module (2), a white module (1), and a black module (1).

Therefore, an arrangement pattern of a character group may be obtained, based on the pattern information storage unit 122, by identifying an arrangement pattern for each character included in a character group of the basic information, and connecting the identified arrangement patterns in the order of the characters in the character group. By rendering bars (rectangles) corresponding to the respective modules constituting the arrangement pattern, the corrected code is rendered.

At this time, the width of each module is calculated by multiplying the basic module by an integer. In this case, the width of the basic module is calculated so as to be converted into a number of dots (dot number) that is an integer number in the resolution of the printer 20 that is the output destination. Therefore, the width of each module is converted into a number of dots that is an integer number in the resolution. Accordingly, each bar in the corrected barcode is rendered without a deviation by less than the decimal point, with respect to dots in the coordinate system of the document data converted into the resolution of the printer 20 that is the output destination. As a result, the corrected barcode is rendered in the document data in a state where the relative relationship of the widths of the modules is maintained to be corresponding to the character group.

Figure 13:
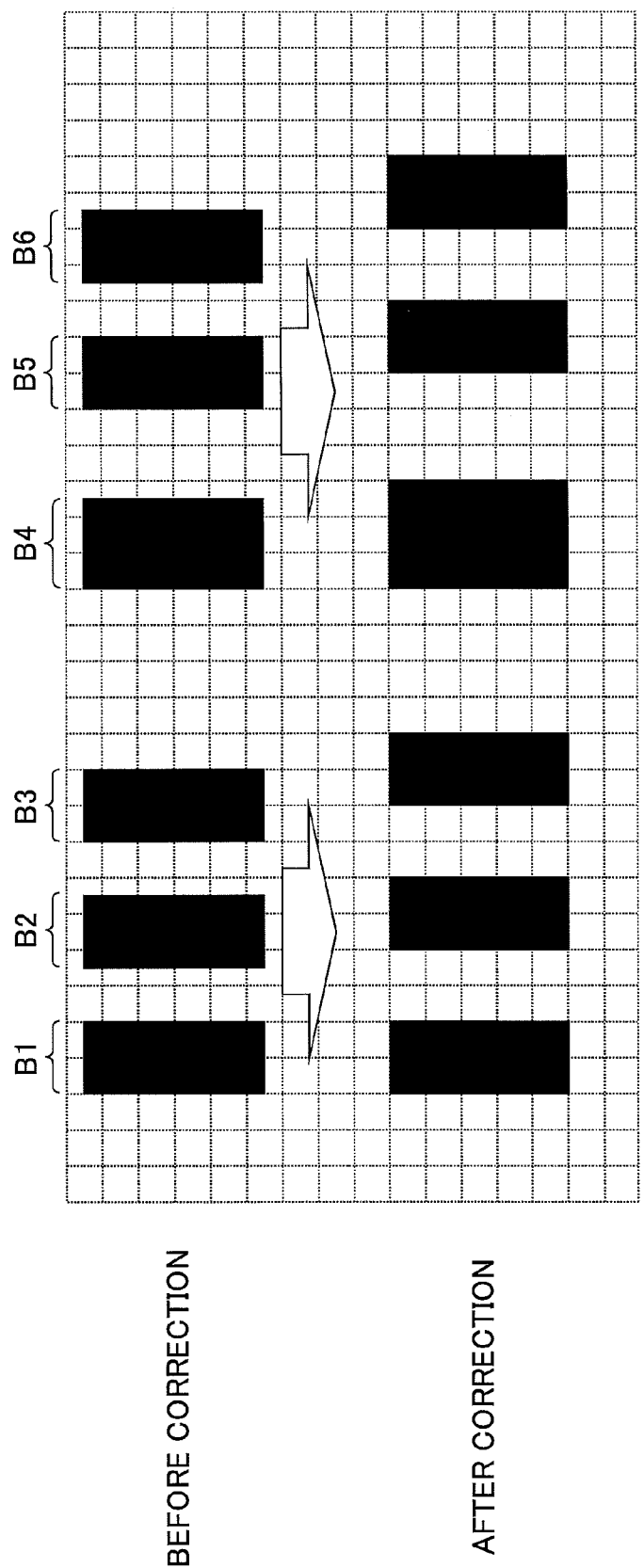
FIG. 13 illustrates a render example of a barcode after correction, according to the first embodiment.

FIG. 13 illustrates a render example of a barcode after correction, according to the first embodiment. In FIG. 13, the rectangles B1, B2, B3, B4, B5, B6 indicate black bars of a barcode. The minimum grid in the lattice (scale) in FIG. 13 expresses one dot (one pixel) in the coordinate system corresponding to the resolution of the printer 20 that is the output destination.

In FIG. 13, before correction, both the left and right sides of the rectangle B2, the right side of the rectangle B4, and both sides of the rectangle B6 do not match the separator lines of the dots. However, after correction, these sides match the separator lines of the dots. Furthermore, the rectangles B1, B2, B3, B5, B6 are black bars having the same width, and these rectangles maintain the relationship of having the same width after the correction. Furthermore, the spaces between the rectangles (i.e., the white bars) also have the same width as the rectangles corresponding to the black bars having the same width. Therefore, the possibility of an error occurring in the corrected barcode is reduced, with respect to the information (character group) embedded in the barcode included in the document data. Note that in FIG. 13, the length of the entire barcode is longer after correction than before correction. However, as the specification information has an allowable range, even if the length of the entire barcode becomes shorter or longer within the allowable range, the reading of the barcode is unaffected. What is important is that the black bars and the white bars that are supposed to have the same width have the same width, and that a bar that is to be N times a basic module has a width that is N times the width of the basic module.

When steps S111 through S116 are executed for all of the code area information (YES in step S117), the print data generation unit 16 converts the document data into print data corresponding to the printer 20 that is the output destination (step S118).

The print data may be immediately sent to the printer 20, or may be stored in the secondary storage device 102 and printed at a convenient time for the user, for example. In this case, the barcode printed on the print sheet is corrected in accordance with the resolution of the printer 20 in advance. Therefore, compared to the case where correction is not performed, the possibility that an error occurs at the time of printing is low.

Figure 14:
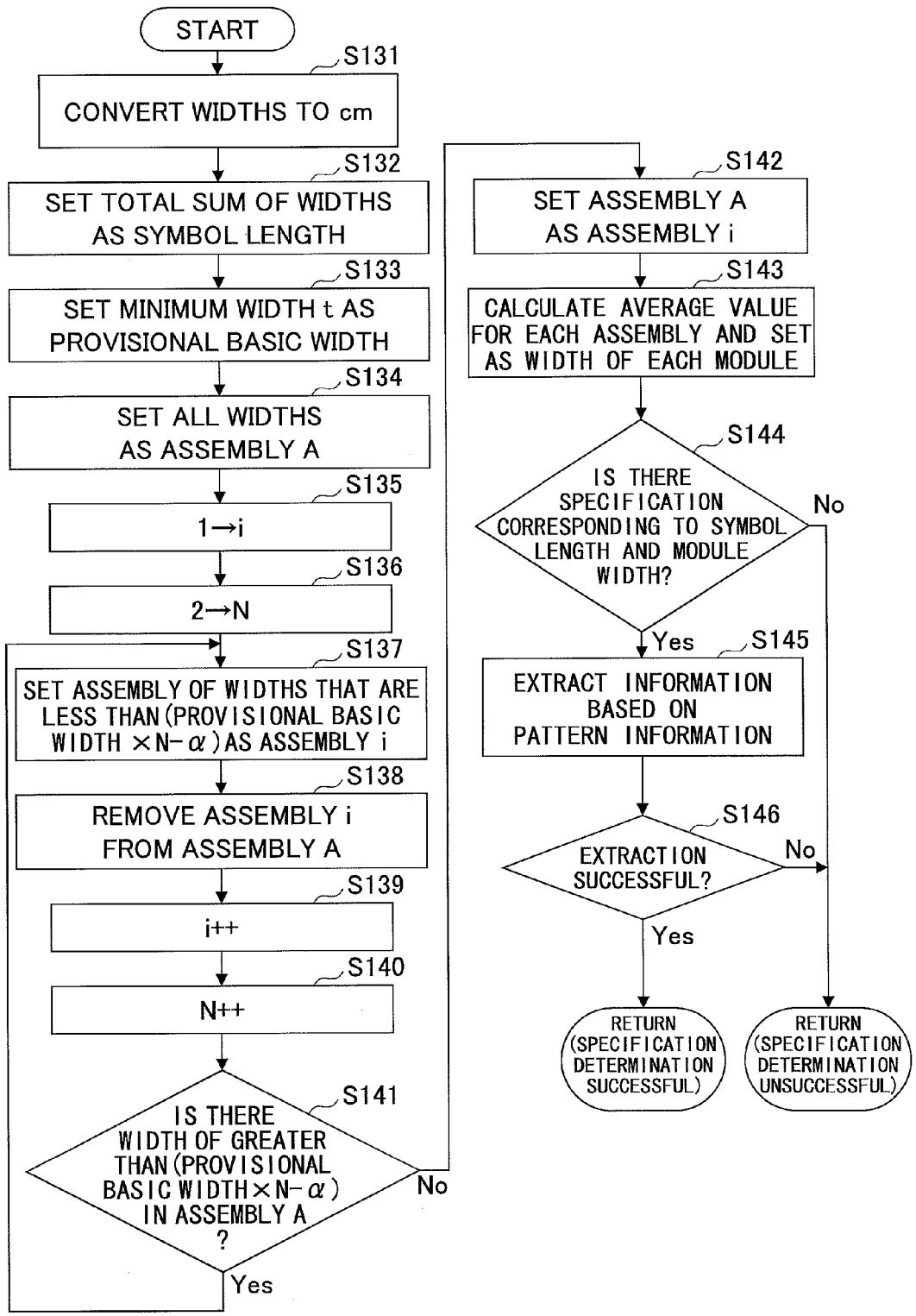
FIG. 14 is a flowchart for describing an example of processing procedures of a specification determination process according to the first embodiment.

Next, details of step S112 are described. FIG. 14 is a flowchart for describing an example of processing procedures of a specification determination process according to the first embodiment.

In step S131, the code information extraction unit 12 converts the black widths and the white widths constituting the arrangement information in the target code area information, into values in units of centimeters (cm) based on the initial resolution of the document data and the number of dots of each of the widths. In the following, unless otherwise noted, the black widths and the white widths are in units of centimeters.

Next, the code information extraction unit 12 obtains the total sum (cm) of all of the black widths and the white widths in the arrangement information of the target code area information, and sets this total sum as the symbol length (step S132). That is to say, this value is recorded as the symbol length of the barcode configuration information (FIG. 10).

Next, the code information extraction unit 12 sets the minimum width in the assembly of all of the black widths and the white widths in the arrangement information of the target code area information, as a provisional basic module width (hereinafter, "provisional basic module width") (step S133). The minimum width is specified regardless of being a black width or a white width. Next, the code information extraction unit 12 stores the assembly of all black widths and white widths as an assembly A, in the memory device 103 (step S134).

In the subsequent steps S135 through S141, the code information extraction unit 12 executes a process of classifying the widths included in the assembly A, into a plurality of groups (a plurality of types of modules).

First, the code information extraction unit 12 assigns 1 in the variable i (step S135). Next, the code information extraction unit 12 assigns 2 in a variable N (step S136). The variable i and the variable N are variables that are used in the loop process of steps S137 through S141.

Next, the code information extraction unit 12 stores, in the memory device 103, an assembly of widths that are less than (provisional basic module width×N−α) in the assembly A, as an assembly i (step S137). Therefore, first, an assembly of widths that are less than a value obtained by subtracting α from two times the provisional basic module width, is stored as an assembly 1. Note that α is a parameter for classifying widths such that, even if a width does not reach (provisional basic module width×N) but the width is closer to (provisional basic module width×N) than (provisional basic module width×(N−1)), the width is classified in a group of (provisional basic module width×N). Therefore, for example, α is to be a value less than (provisional basic module width÷2).

Next, the code information extraction unit 12 removes the widths included in the assembly i, from the assembly A (step S138). Next, the code information extraction unit 12 adds one to each of the variable i and the variable N (step S139). Next, the code information extraction unit 12 determines whether there is a width that is greater than or equal to (provisional basic module width×N−α) in the assembly A (step S141). When there is a width of greater than or equal to (provisional basic module width×N−α) in the assembly A (YES in step S141), the code information extraction unit 12 repeats step S137 and onward. When there is no width of greater than or equal to (provisional basic module width×N−α) in the assembly A (NO in step S141), the code information extraction unit 12 stores the widths included in the assembly A as an assembly i, in the memory device 103 (step S142). However, when the assembly A is empty, step S142 is not executed.

Note that when the barcode relevant to the target code area information is a JAN code, all widths included in the target code area information are classified into an assembly 1 corresponding to the module (1), an assembly 2 corresponding to the module (2), and an assembly 3 corresponding to the module (3).

Next, the code information extraction unit 12 calculates an average value of widths, for each classified assembly (step S143). The code information extraction unit 12 records the average value in the barcode configuration information, as a width of the module corresponding to the assembly relevant to the average value. As a result, with regard to the target code area information, barcode configuration information as illustrated in FIG. 10 is generated.

Next, the code information extraction unit 12 determines whether the rule information with which the generated barcode configuration information conforms, is stored in the rule information storage unit 121 (FIG. 9) (step S144). For example, in the case of the barcode configuration information of FIG. 10, it is determined whether there is rule information in which there are three types of modules, the range of the width of each module includes a value included in the barcode configuration information, and the range of the symbol length includes a value included in the barcode configuration information.

When there is no rule information with which the barcode configuration information conforms (NO in step S144), the code information extraction unit 12 determines that the determination of the specification with respect to the target code area information is unsuccessful.

When there is the rule information with which the generated barcode configuration information conforms (hereinafter, "conforming rule information") (YES in step S144), the code information extraction unit 12 extracts a character group (information embedded in the barcode) from the arrangement pattern of the black widths and the white widths included in the arrangement information of the target code area information (step S145). More specifically, the code information extraction unit 12 replaces the black widths and the white widths included in the arrangement information of the target code area information with the types of modules, and obtains the pattern of arrangement of the types of modules. Next, the code information extraction unit 12 makes an attempt to convert the arrangement pattern of types of modules into a character group, based on the pattern information of the specification of the conforming rule information stored in the pattern information storage unit 122. When there are a plurality of conforming rule information items, the code information extraction unit 12 attempts the conversion into a character group, based on the pattern information of each of the plurality of specifications.

When a character group is successfully extracted based on the pattern information of any one of the specifications (YES in step S146), the code information extraction unit 12 determines that the determination of the specification relevant to the target code area information is successful. That is to say, it is determined that the specification relevant to the pattern information for which a character group is successfully extracted, is the specification of the barcode relevant to the target code area information. Furthermore, the extracted character group is stored in, for example, the memory device 103.

When no character groups are extracted based on the pattern information of any of the specifications (NO in step S146), the code information extraction unit 12 determines that the determination of the specification relevant to the target code area information is unsuccessful.

Note that in the above, a description is given of an example where the document data is raster data that partially integrally includes the image data of the barcode; however, the data construction of the document data is not limited to such a format.

FIGS. 15A through 15D illustrate examples of data structures of document data. FIG. 15A illustrates a format in which image data of a barcode is included in the document data of raster data having a resolution. That is to say, this is the format used in the above description.

FIG. 15B illustrates a format in which vector data of a barcode is included (pasted) in the document data of raster data having a resolution. In this case, the position of the barcode may be expressed by coordinate values in units of the number of dots in the document data, or coordinate values in units of inches.

FIG. 15C illustrates a format in which image data of a barcode is included (pasted) in the document data of vector data. In this case, the position of the barcode is expressed by coordinate values in units of inches.

FIG. 15D illustrates a format in which vector data of a barcode is included (pasted) in the document data of vector data. In this case, the position of the barcode is expressed by coordinate values in units of inches.

When the document data is vector data as in FIG. 15C and FIG. 15D, step S109 of FIG. 9 (the process of converting the resolution of the document data) may be omitted.

Furthermore, when the barcode is vector data as in FIG. 15B and FIG. 15D, in steps S102 and S103, the code information extraction unit 12 may extract, for example, a render command of a rectangle from the document data, instead of generating a midpoint image and performing the process of recognizing linear lines. In this case, in step S104 and onward, the area in which the density of searched rectangles relevant to the render command exceeds a threshold, is set as a code area, and code area information (FIG. 8) of each code area is stored in the memory device 103. However, in this case, the range information and the arrangement information of the code area information are not in units of dots, and are in units of, for example, inches. Therefore, the part that is processed in units of dots in the above description, is to be processed in units of inches instead.

For example, in the calculation of the basic module width in step S114, the minimum width (inches) in the barcode configuration information is a value that becomes an integer value when converted into a number of dots of the resolution of the printer 20 that is the output destination, which is converted to a value closest to the width. A value obtained by converting this value into centimeters is set as the basic module width.

Furthermore, the coordinate values of the range of the basic information is a value that becomes an integer value when, for example, the range information (X1, Y1, X2, Y2) (inches) of the target code area information is converted into a number of dots of the resolution of the printer 20 that is the output destination, which is converted into a value closest to the initial value. A value obtained by converting this value into centimeters is set as coordinate values of the range of basic information.

In step S116, a render command of a rectangle group indicating the corrected barcode group is to be described in the document data, based on the basic information calculated as described above.

As described above, according to the first embodiment, as to a barcode included in document data, the position and the width of each bar are corrected in accordance with the resolution of the printer 20 that is the output destination. Therefore, in the printed barcode, it is possible to reduce the possibility of unevenness occurring in the widths of bars (bars of the same module) which are supposed to have the same width. That is to say, it is possible to reduce errors in the printed barcode.

Furthermore, in the first embodiment, the specification of the barcode included in the document data is automatically determined based on the specification information of each specification and the pattern information. Therefore, even when the barcode included in the document data is not fixed, it is possible to generate a corrected code of the barcode.

Note that when the specification of the barcode included in the document data is not fixed in an operation, there is no need to determine the specification of the barcode.

Next, a description is given of a second embodiment. In the second embodiment, the points that are different from the first embodiment are described. Therefore, points that are not particularly mentioned may be the same as those of the first embodiment.

In the second embodiment, it is assumed that the document data includes a two-dimensional code, as an example of a coded image. Therefore, among the units illustrated in FIG. 5, the units that execute processes relevant to a barcode in the first embodiment execute processes relevant to a two-dimensional code in the second embodiment.

Figure 16:
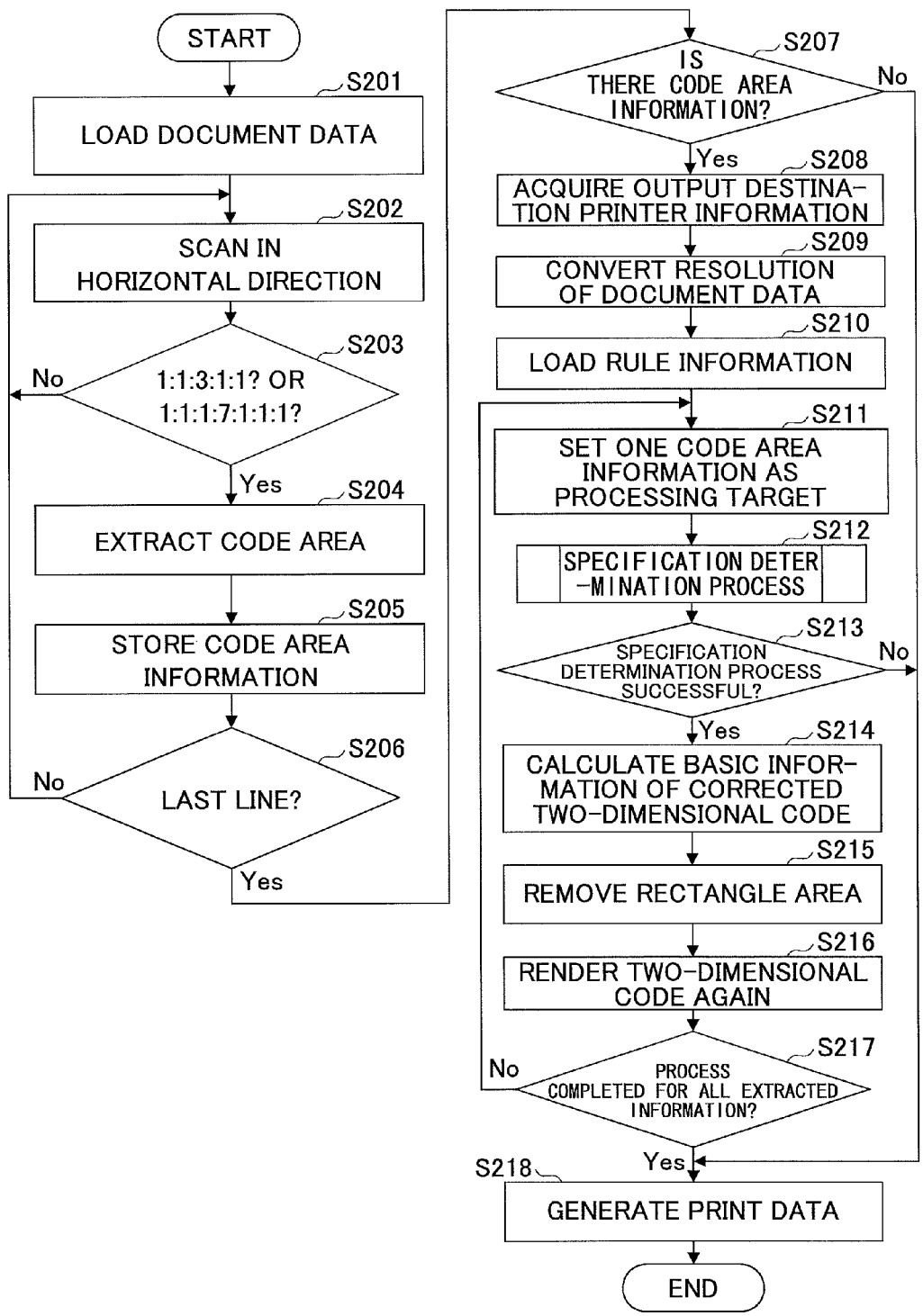
FIG. 16 is a flowchart for describing an example of processing procedures executed by the information processing device according to a second embodiment.

FIG. 16 is a flowchart for describing an example of processing procedures executed by the information processing device 10 according to the second embodiment. Note that in the processing procedures of FIG. 16, it is assumed that the document data has the structure illustrated in FIG. 15A. That is to say, the document data is raster data having resolution, and an image of a two-dimensional code is partially integrally included in the raster data.

For example, in response to input of a print instruction of document data stored in the secondary storage device 102, the code area extraction unit 11 loads the document data, which is specified as the target of the print instruction, into the memory device 103 (step S201). Next, the code area extraction unit 11 performs an operation of scanning a group of pixels constituting lines, for each of the lines in the document data (step S202), and determines whether there is a part where the ratio (ratio of widths) of the number of pixels of a group of continuous black pixels (black width) and the number of pixels of a group of continuous white pixels (white width), is a predetermined ratio (step S203).

In this case, the predetermined ratio is "1 (black):1 (white):3 (black):1 (white):1 (black)" or "1 (black):1 (white):1 (black):7 (white):1 (black):1 (white):1 (black)". The former ratio "1:1:3:1:1" is the ratio between black widths and white widths in a position detection pattern of a QR code (registered trademark, which is a type of a two-dimensional code. The latter ratio "1:1:1:7:1:1:1" is the ratio between black widths and white widths in a position detection pattern of a maxi code, which is a type of a two-dimensional code.

Figure 17B:
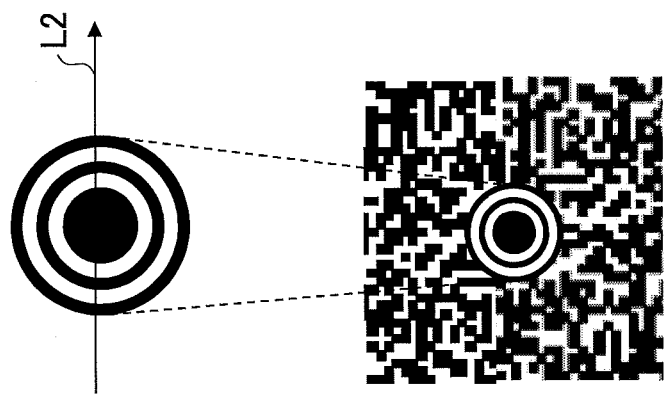
FIGS. 17A and 17B illustrate examples of a QR code (registered trademark) and a maxi code, respectively.
Figure 17A:
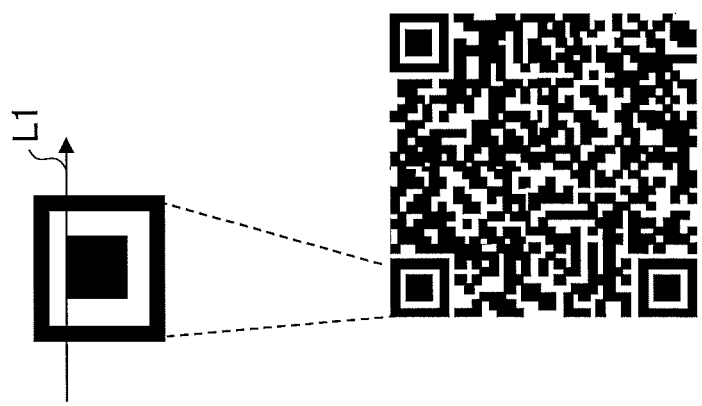

FIGS. 17A and 17B illustrate examples of a QR code (registered trademark) and a maxi code, respectively. FIG. 17A illustrates an example of a QR code (registered trademark). Usually, a QR code (registered trademark) includes a position detection pattern at the three corners. In FIG. 17A, on top of the QR code (registered trademark), one position detection pattern is illustrated in an enlarged state. The black widths and the white widths in the position detection pattern of the QR code (registered trademark) have a ratio of "1:1:3:1:1", in the horizontal direction, the vertical direction, and the diagonal direction.

Furthermore, FIG. 17B illustrates an example of a maxi code. A maxi code includes a position detection pattern at the center. In FIG. 17B, on top of the maxi code, one position detection pattern is illustrated in an enlarged state. The black widths and the white widths in the position detection pattern of the maxi code have a ratio of "1:1:1:7:1:1:1".

Therefore, in step S203, it is determined whether a part having a possibility of constituting a position detection pattern of the QR code (registered trademark) or the maxi code, has been detected.

When a part having a predetermined ratio (ratio of widths) of the number of pixels of a group of continuous black pixels (black width) and the number of pixels of a group of continuous white pixels (white width) is detected (YES in step S203), the code area extraction unit 11 assumes that the detected part is a predetermined position of the position detection pattern. Then, the code area extraction unit 11 uses the detected part as a reference in extracting a rectangular area estimated as being a range of the QR code (registered trademark) or the maxi code, as the code area (step S204).

For example, when a process is performed for each line, the first time a ratio of "1:1:3:1:1" is detected in the QR code (registered trademark), is when a line L1 (see FIG. 17A) including the first row at the top edge of the black rectangle inside the position detection pattern in the top left corner of the QR code (registered trademark), is set as the processing target. Therefore, it is possible to estimate the range of the QR code (registered trademark) based on the relationship between the position of the line L1 (the number from the top), the number of pixels constituting the ratio of "1:1:3:1:1" (that is to say, the width of the position detection pattern), and the relative position and size with respect to the whole QR code (registered trademark).

Furthermore, when a process is performed for each line, the first time a ratio of "1:1:1:7:1:1:1" is detected in the maxi code, is when a line L2 (see FIG. 17B) passing through the center of the position detection pattern in the maxi code, is set as the processing target. Therefore, it is possible to estimate the range of the maxi code based on the relationship between the position of the line L2 (the number from the top), the number of pixels constituting the ratio of "1:1:1:7:1:1:1" (that is to say, the width of the position detection pattern), and the relative position and size with respect to the whole maxi code.

Next, the code area extraction unit 11 stores code area information in the memory device 103, with respect to the extracted code area (step S205).

FIG. 18 illustrates a configuration example of code area information according to the second embodiment. In FIG. 18, one item of (one line of) code area information corresponds to one code area, and includes position detection pattern information and an image arrangement pointer.

The position detection pattern information indicates the coordinate value (in units of dots (pixels)) of the center point (intersection of diagonal lines) of each position detection pattern. For example, when the code area information corresponds to a QR code (registered trademark), the position detection pattern information includes the coordinate value of the intersection of diagonal lines in each of the three position detection patterns.

The image arrangement pointer is a pointer with respect to the two-dimensional arrangement (hereinafter, "image arrangement") in which the pixel values of the pixels of the code area are the elements. A black pixel value is "1" and a white pixel value is "0".

That is to say, in step S205, with respect to the extracted code area, the center point of the position detection pattern is obtained, and the pixel values of the pixels constituting the code area are stored in the image arrangement.

Note that the values of the elements of the image arrangement of FIG. 18 do not precisely express the image arrangement with respect to the QR code (registered trademark). Furthermore, FIG. 18 illustrates a state where the code area information relevant to three or more code areas is extracted; however, immediately after step S205 is first executed, the code area information will be in a state where one code area information item is extracted.

Steps S202 through S205 are repeated until the process reaches the last line in the document data (step S206). However, steps S204 and S205 are not executed twice or more with respect to the same two-dimensional code. That is to say, one code area information item is stored with respect to each two-dimensional code.

Note that as the method of detecting a QR code (registered trademark) and a method of detecting a maxi code, methods other than the above may be applied. Furthermore, when a two-dimensional code other than a QR code (registered trademark) or a maxi code is the detection target, the detection of the two-dimensional code and the extraction of the code area of the two-dimensional code are performed by detecting a characteristic part of the two-dimensional code.

When the processing reaches the last line in the document data (YES in step S206), the code information extraction unit 12 determines whether the code area information is stored in the memory device 103 (step S207). That is to say, it is determined whether the document data includes a code area (an area that has a high possibility of being a two-dimensional code).

When the code area information is not stored in the memory device 103 (NO in step S207), the print data generation unit 16 generates print data (PDL data) corresponding to the printer 20 that is the output destination with respect to the document data (step S218).

When one or more items of the code area information are stored in the memory device 103 (YES in step S207), the code information extraction unit 12 executes the same processes as steps S108 and S109 of FIG. 6 in steps S208 and S209.

Next, the code information extraction unit 12 loads the rule information stored in the rule information storage unit 121, into the memory device 103 (step S210).

FIG. 19 illustrates a configuration example of the rule information storage unit 121 according to the second embodiment. As illustrated in FIG. 19, the rule information storage unit 121 stores rule information (configuration information) for each specification (or type) of barcode. FIG. 19 illustrates an example of rule information of the QR code (registered trademark). The rule information includes, for each version of the QR code (registered trademark), the number of cells in the vertical direction and the horizontal direction and (identification information of) a mask pattern. Furthermore, the rule information includes pattern information, as information common to all versions.

A cell is a rectangle (square) that is the minimum configuration element of the QR code (registered trademark). The sizes of all configuration elements of a QR code (registered trademark) are identified in units of cells.

A mask pattern is information (pit arrangement) for extracting a coded area from the QR code (registered trademark). The coded area is an area indicating a character group. That is to say, the coded area is an area formed by removing an area for control, such as a position detection pattern.

The pattern information is information indicating an arrangement pattern of cells in a two-dimensional space, for each character. That is to say, the pattern information corresponds to the pattern information stored in the pattern information storage unit 122 in the first embodiment.

Next, the code information extraction unit 12 sets one of the code area information items stored in the memory device 103, as the processing target (step S211). Next, the code information extraction unit 12 executes a specification determination process, with respect to the two-dimensional code relevant to the code area information that is the processing target (hereinafter, "target code area information") (step S212). In the specification determination process, for example, the code information extraction unit 12 generates two-dimensional code configuration information illustrated in FIG. 20, based on the target code area information.

FIG. 20 illustrates a configuration example of two-dimensional code configuration information. In FIG. 20, the two-dimensional code configuration information includes the number of cells, a cell size, and an image arrangement pointer. As the image arrangement pointer, the image arrangement pointer of the target code area information is directly used. The cell size is, for example, the minimum value of continuous numbers of "1 (black pixel)" or "0 (white pixel)" in the horizontal direction or the vertical direction of the image arrangement identified by the image arrangement pointer. The number of cells is obtained by dividing the number of dots in the horizontal direction and the number of dots in the vertical direction in the image arrangement, by the cell size.

The code information extraction unit 12 determines whether rule information with which the generated two-dimensional code configuration information conforms, is stored in the rule information storage unit 121 (FIG. 19). When there is one or more rule information items with which the two-dimensional code configuration information conforms, the code information extraction unit 12 attempts to extract a character group (information) from the image arrangement of the two-dimensional code configuration information, based on the pattern information of each rule information. When the extraction of the character group is successful, the code information extraction unit 12 determines that the determination of the specification is successful. That is to say, the code information extraction unit 12 determines that the specification relevant to the rule information for which the character group has been successfully extracted, is the specification of the two-dimensional code relevant to the target code area information. The extracted character group is stored in, for example, the memory device 103. Note that the version is also identified together with the identification of the specification.

Meanwhile, when rule information with which the two-dimensional code configuration information conforms is not stored in the rule information storage unit 121, the code information extraction unit 12 determines that the determination of the specification is unsuccessful. Furthermore, when a character group is not extracted based on any of the rule information items with which the two-dimensional code configuration information conforms, the code information extraction unit 12 determines that the determination of the specification is unsuccessful.

When the determination of the specification is unsuccessful (NO in step S213), the process proceeds to step S218. Meanwhile, when the determination of the specification is successful, that is to say, when a specification with which the two-dimensional code relevant to the target code area information conforms is identified, and information (character group) indicated by the two-dimensional code is extracted (YES in step S213), the corrected code information calculation unit 13 calculates the basic information of the two-dimensional code after correction (corrected two-dimensional code), based on processing results of the specification determination process (step S214).

FIG. 21 illustrates a configuration example of basic information of a corrected two-dimensional code. In FIG. 21, the basic information includes a specification, a version, a range, a character group, a cell size, a symbol size, a quiet zone, and a resolution.

The specification and the version are the specification and the version with which the corrected two-dimensional code to be generated, is to comply. The range is the coordinate values (in units of dots) of the top left vertex and the bottom right vertex of the range in which the corrected two-dimensional code is to be arranged in the document data. The character group is information to be indicated (expressed) by the corrected two-dimensional code. The cell size is the size of the cell of the corrected two-dimensional code. The symbol size is the size (in units of dots) of one side of the corrected two-dimensional code. The quiet zone is the width (in units of dots) of a blank area, which is provided around the corrected two-dimensional code. The resolution is the resolution of the printer 20 that is the output destination.

Among the above items, the values of the specification, the version, and the character group are obtained from the processing results of the specification determination process in step S212. Furthermore, as to the resolution, the value acquired in step S208 is directly used. Therefore, in step S214, the cell size, the symbol size, the quiet zone, and the range are calculated.

The cell size (hereinafter, "post-correction cell size") is calculated based on the cell size in the two-dimensional code configuration information generated in step S212 (hereinafter, "pre-correction cell size"), the initial resolution of the document data (hereinafter, "initial resolution"), and the resolution of the printer 20 that is the output destination (hereinafter, "output destination resolution"). Specifically, the integer value that is closest to a value calculated by pre-correction cell size×(output destination resolution÷initial resolution), is set as the post-correction cell size. For example, when the initial resolution of the document data is 400 dpi, and the pre-correction cell size is three dots, the absolute dimension of the pre-correction cell size is 3÷400=0.0075 (inches). When the resolution of the printer 20 that is the output destination is 600 dpi, 0.0075 (inches) is 600×0.0075=4.5 (dots). The integer value closest to 4.5 is 4 or 5. Therefore, 4 or 5 is the post-correction cell size.

The symbol size is calculated based on the post-correction cell size, the specification, and the version. That is to say, according to the specification and the version, the number of cells (for example, 21) is identified. By multiplying the number of cells by the cell size, the symbol size is calculated.

The quiet zone is defined as, for example, four cells at minimum in the case of a QR code (registered trademark), and is therefore calculated based on the cell sizes.

Among the coordinate values of the range, the top left vertex is calculated based on the position detection pattern information of the target code area information. That is to say, the coordinate value of the top left vertex of the two-dimensional code is obtained, in the initial resolution of the document data, based on the position detection pattern information. Then, the conversion logic of the resolution similar to that of step S209 is applied to this coordinate value of the top left vertex, and the obtained value is set as the coordinate value of the top left vertex of the range. The coordinate value of the bottom right vertex of the range is obtained by adding symbol size÷quite zone×2, to the coordinate value of the top left vertex.

Next, the code area removal unit 14 removes the render information of the rectangular area indicated by the range of the basic information of the corrected two-dimensional code, in the document data (whose resolution has been converted) (step S215). That is to say, the two-dimensional code embedded in the document data is removed. Note that the rectangular area that is the removal target may be, for example, extended by several dots outside the rectangular area indicated by the range of the basic information of the corrected two-dimensional code. Next, the corrected code render unit 15 renders the corrected two-dimensional code in the document data, based on the basic information of the corrected two-dimensional code and the pattern information storage unit 122 (step S216).

The rendering of the corrected two-dimensional code may be performed similarly to the rendering of the corrected barcode, based on the character group included in the basic information of the corrected two-dimensional code and the pattern information included in the rule information of the specification of the corrected two-dimensional code.

In this case, the size of the configuration element of the corrected two-dimensional code is determined by using a cell as the minimum unit. In this case, the size of a cell is calculated as the number of dots of an integer value in the resolution of the printer 20 that is the output destination, step S214. Accordingly, the width and height of each configuration element are converted into a number of dots of an integer value in the resolution of the printer 20 that is the output destination. Thus, the configuration elements of the corrected two-dimensional code are rendered without a deviation by less than the decimal point, with respect to dots in the coordinate system of the document data converted into the resolution of the printer 20 that is the output destination. As a result, the corrected two-dimensional code is rendered in the document data in a state where the relative relationship of the sizes of the configuration elements is maintained to be corresponding to the character group.

Figure 22:
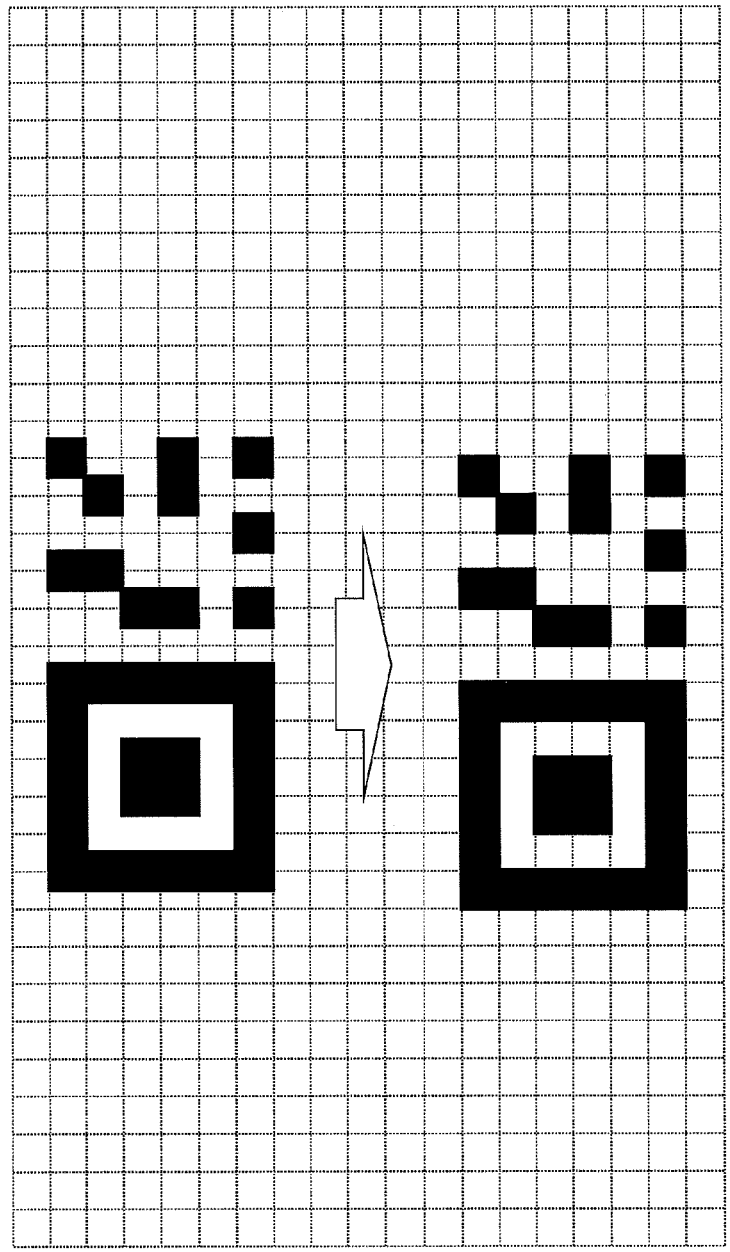
FIG. 22 illustrates a render example of a barcode after correction, according to the second embodiment.

FIG. 22 illustrates a render example of a barcode after correction, according to the second embodiment. The minimum grid (scale) in the lattice in FIG. 22 expresses one dot (one pixel) in the coordinate system corresponding to the resolution of the printer 20 that is the output destination.

In FIG. 22, before correction, there are configuration elements having a side that does not match the separator lines of the dots. However, after correction, the sides of all of the configuration elements match the separator lines of the dots. Furthermore, the relative relationship of the sizes of the configuration elements is maintained at the state before correction. Therefore, the possibility of an error occurring in the information (character group) embedded in the two-dimensional code is reduced.

When steps S211 through S216 are executed for all code area information items (YES in step S217), the print data generation unit 16 converts the document data into print data corresponding to the printer 20 that is the output destination (step S218).

Note that also in the case of a two-dimensional code, the document data may have any of the structures of FIGS. 15A through 15D, similar to the case of the barcode. Furthermore, the processing contents in the case where the two-dimensional code is vector data are obvious from the description of the processing contents in the case where the barcode is vector data, and therefore descriptions thereof are omitted.

As described above, according to the second embodiment with respect to a two-dimensional code included in document data, the same effects as those of the first embodiment are achieved.

Next, a description is given of a third embodiment. In the third embodiment, a description is given of a calibration function in consideration of a dot gain of the printer 20.

Figure 23:
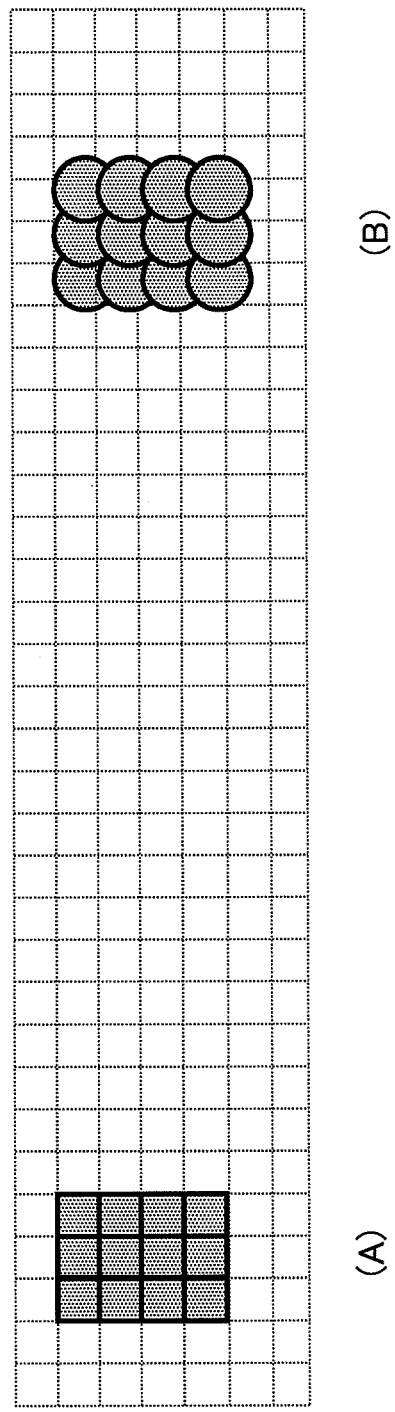
FIG. 23 is a diagram for describing the dot gain of a printer.

FIG. 23 is a diagram for describing the dot gain of a printer. Each grid in the lattice in FIG. 23 expresses one dot in the resolution of the printer 20.

Generally, the printer 20 fixes the ink or toner in a spread-out manner as illustrated in FIG. 23 (B) so that gaps are not formed between dots, instead of fixing the ink or toner in accordance with the grids as illustrated in FIG. 23 (A). As a result, a phenomenon occurs in which the halftone dots in the printed matter become thicker than the ideal size. This phenomenon is referred to as "dot gain". The level of dot gain varies according to the printer 20 and the print sheet. Therefore, according to the printer 20 and the print sheet, the dot gain may cause the width of the black bar to increase and the width of the white bar to decrease in a barcode, or may cause the cell to enlarge in a two-dimensional code.

Thus, in consideration of such a dot gain, in the third embodiment, a description is given of a calibration function with respect to the process of correcting the barcode or the two-dimensional code according to the first and second embodiments.

Figure 24:
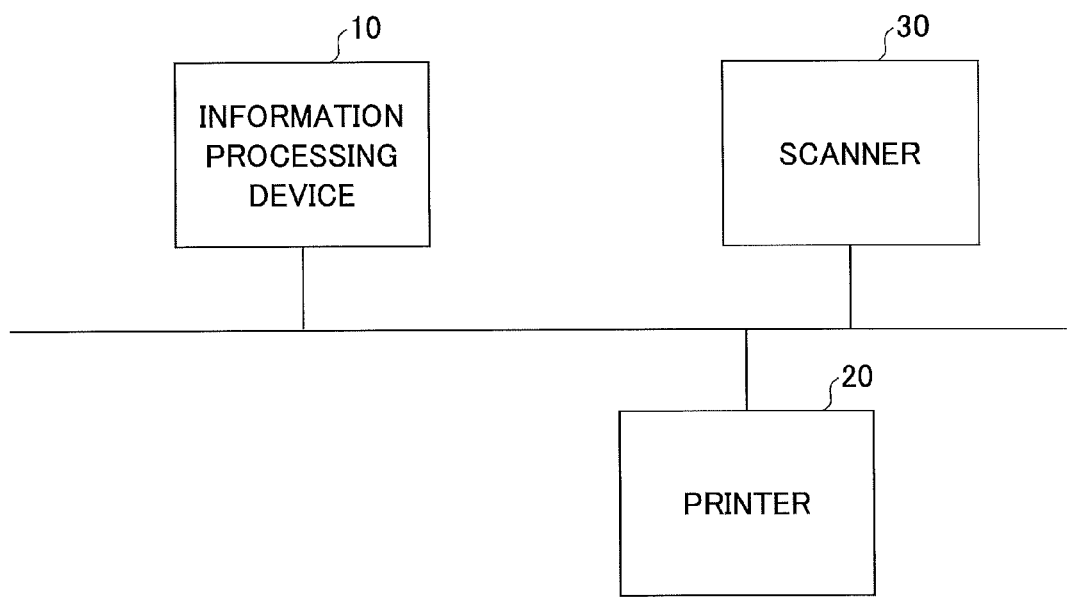
FIG. 24 illustrates a configuration example of an information processing system according to a third embodiment.

FIG. 24 illustrates a configuration example of an information processing system according to the third embodiment. In FIG. 24, the same elements as those of FIG. 3 are denoted by the same reference numerals, and descriptions thereof are omitted.

In the third embodiment, a scanner 30 and the information processing device 10 are connected so that communication is possible, via a network. The scanner 30 scans image data from a paper document, and transfers the image data to the information processing device 10.

Figure 25:
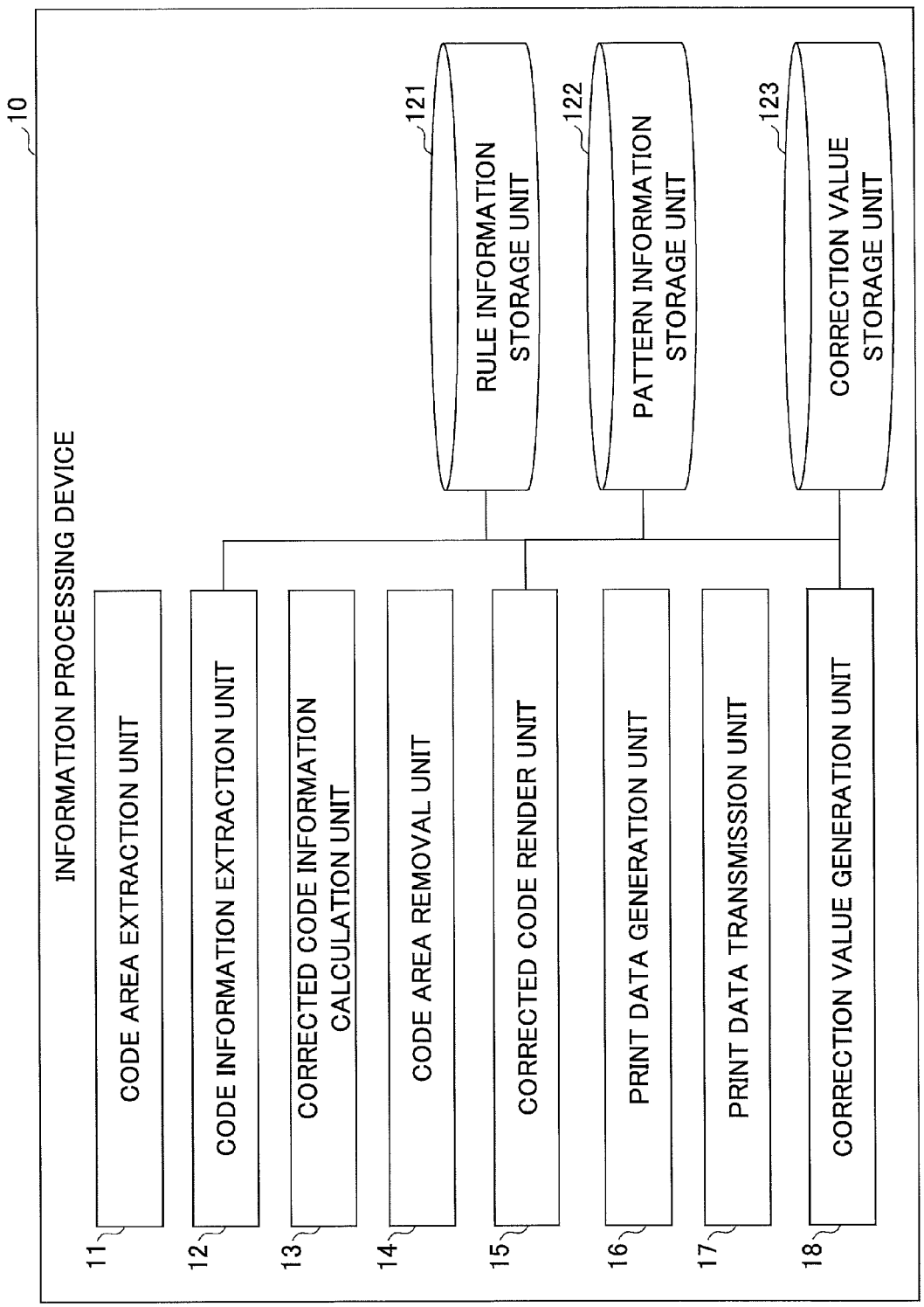
FIG. 25 illustrates a functional configuration example of the information processing device according to the third embodiment.

FIG. 25 illustrates a functional configuration example of the information processing device 10 according to the third embodiment. In FIG. 25, the same elements as those of FIG. 5 are denoted by the same reference numerals, and descriptions thereof are omitted.

In FIG. 25, the information processing device 10 further includes a correction value generation unit 18 and a correction value storage unit 123. The correction value generation unit 18 extracts the difference between the number of dots in the document data and the number of dots after printing, and generates a correction value with respect to the number of dots in the document data, based on the extracted difference. The correction value storage unit 123 stores the correction value generated by the correction value generation unit 18. Note that the correction value generation unit 18 is realized by a process, which a program installed in the information processing device 10 causes the CPU 104 to execute. The correction value storage unit 123 may be realized by a storage device that is connected to the secondary storage device 102 or the information processing device 10 via a network.

Figure 26:
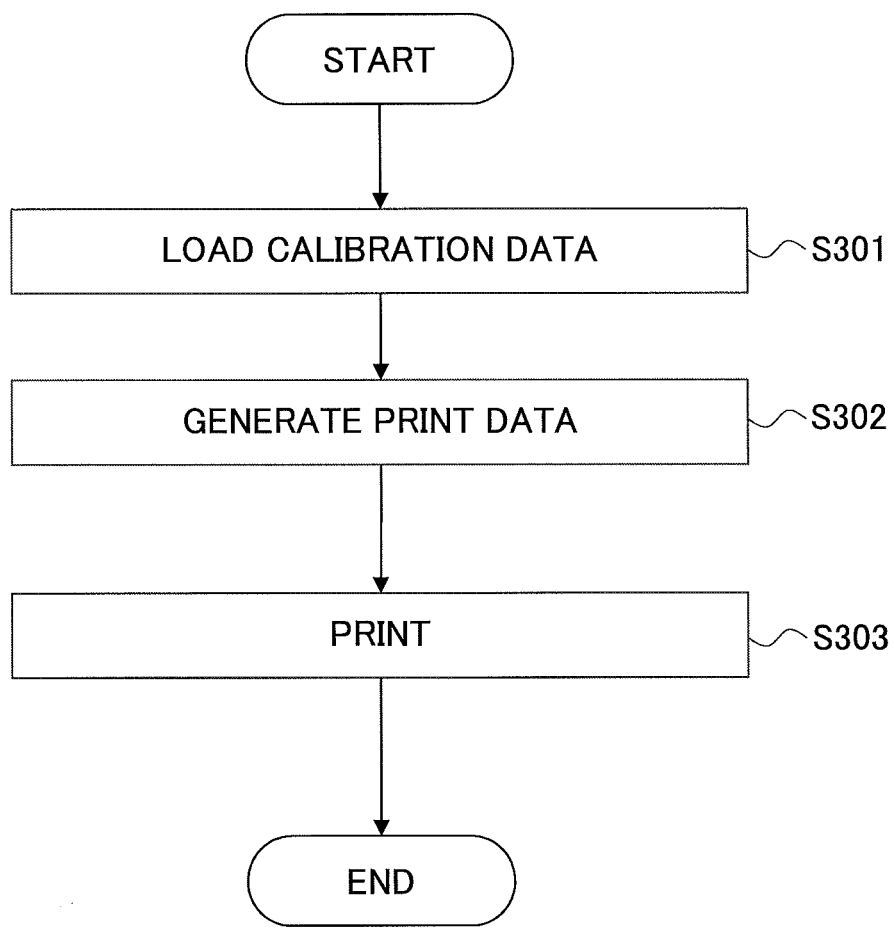
FIG. 26 is a flowchart for describing an example of processing procedures of a printing process of calibration data.

FIG. 26 is a flowchart for describing an example of processing procedures of a printing process of calibration data.

In step S301, when an instruction to print calibration data is input, the print data generation unit 16 loads the calibration data saved in the secondary storage device 102 into the memory device 103.

Figure 27:
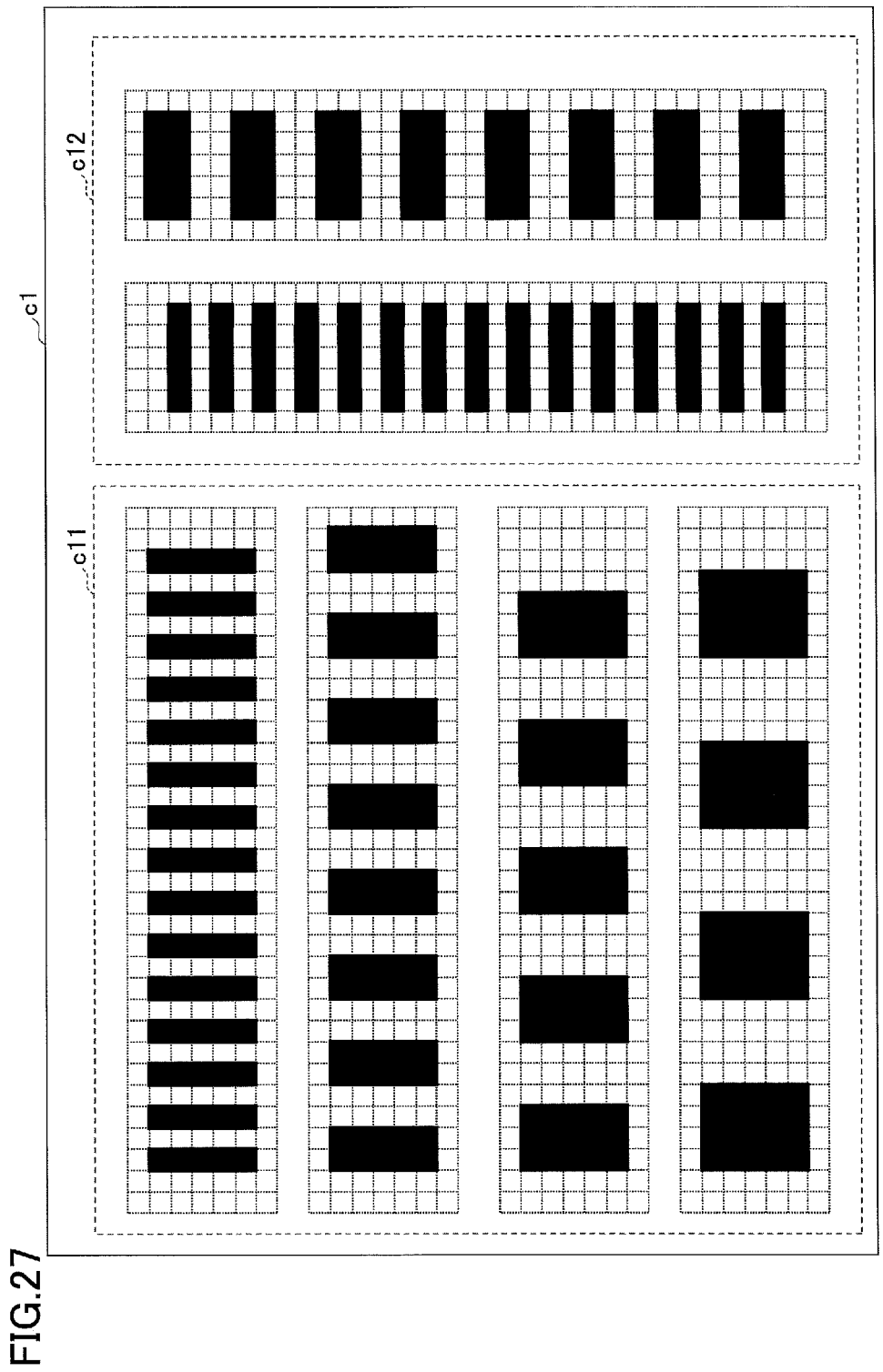
FIG. 27 illustrates an example of calibration data.

FIG. 27 illustrates an example of calibration data. The calibration data is raster data using a predetermined number of dots as the basic unit, in which a group of rectangles having a width that is an integral multiple of the basic unit are rendered, and which has the same resolution as that of the printer 20 that is the output destination. The basic unit preferably matches the width (dot) of the basic module of a barcode or the cell size (dot) of a two-dimensional code, in the resolution of the printer 20 that is the output destination. However, the width of each rectangle may be in units of a predetermined number of dots, regardless of the width of the basic module or the cell sizes.

In FIG. 27, calibration data c1 includes an area c11 and an area c12. The area c11 is used for measuring the size of the dot gain in the horizontal direction or the main scanning direction (X direction). Therefore, vertically long rectangles are arranged, which have a width that is an integral multiple of the basic unit.

The area c12 is used for measuring the size of the dot gain in the vertical direction or the sub scanning direction (Y direction). Therefore, vertically long rectangles are arranged, which have a height that is an integral multiple of the basic unit.

However, squares having a side that is an integral multiple of the basic unit may be arranged. In this case, the squares may be used to measure the size of the dot gain in both the vertical and horizontal directions.

Next, the print data generation unit 16 generates print data corresponding to the printer 20, with respect to the calibration data c1 (step S302). The print data generation unit 16 transfers the generated print data to the printer 20. The printer 20 executes printing based on the print data (step S303). As a result, a group of rectangles as indicated by the calibration data c1 of FIG. 27 are printed on a print sheet. Hereinafter, a sheet on which the calibration data is printed is referred to as a "calibration sheet". Note that the calibration data c1 has the same resolution as that of the printer 20, and therefore in the generated print data, there is a low possibility that the width or height of each rectangle has an error with respect to the calibration data c1.

Figure 28:
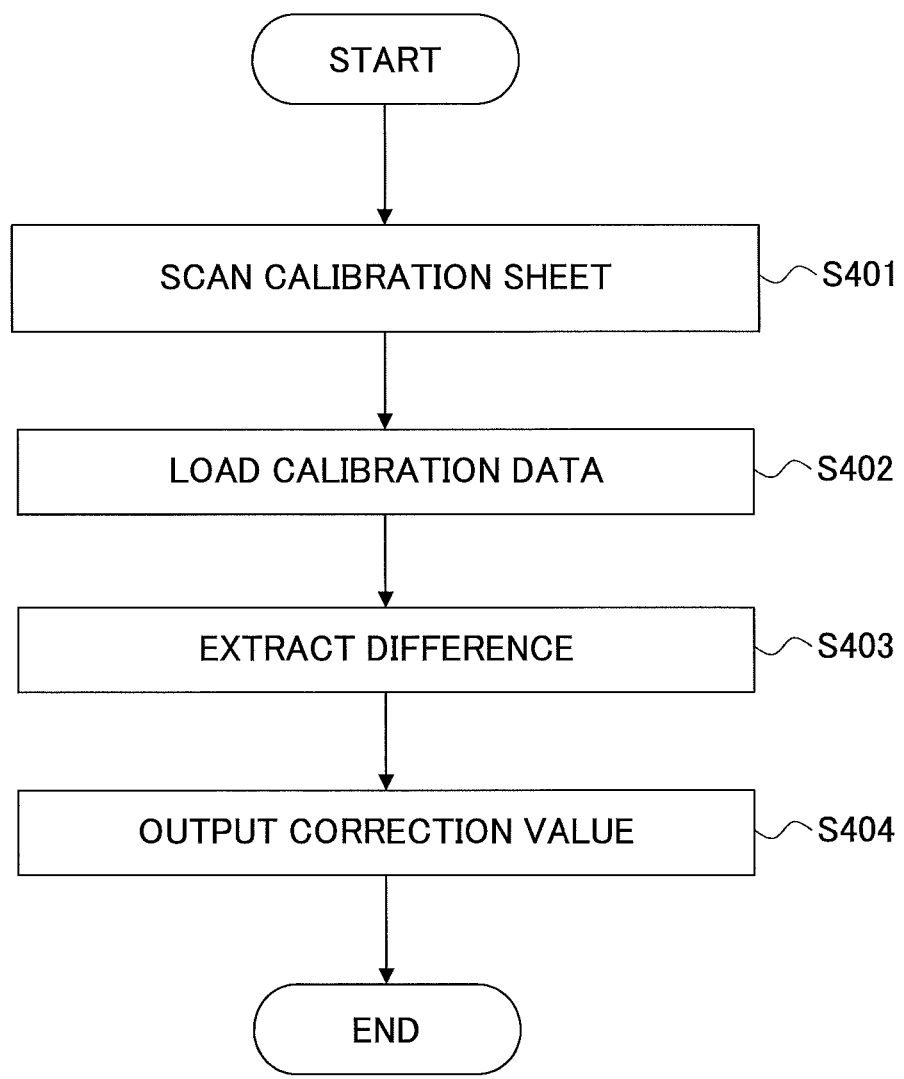
FIG. 28 is a flowchart for describing an example of processing procedures of a process of generating a correction value with respect to the dot gain.

Next, the process illustrated in FIG. 28 is executed. FIG. 28 is a flowchart for describing an example of processing procedures of a process of generating a correction value with respect to the dot gain.

In step S401, the scanner 30 scans image data from the calibration sheet. Hereinafter, the scanned image data is referred to as "scan data". The scan data is transferred to the information processing device 10, and is loaded into, for example, the memory device 103.

Next, the correction value generation unit 18 loads the calibration data c1 (FIG. 27) into the memory device 103 from the secondary storage device 102 (step S402). The correction value generation unit 18 performs a comparison or matching on the scan data and the calibration data c1, and extracts the difference between corresponding rectangles (step S403). Corresponding rectangles mean rectangles having the same N value, with respect to the width or height of the basic unit×N. Note that in order to easily recognize the corresponding relationship between rectangles, in the calibration data c1, marks (figures) corresponding to the N value may be rendered.

The difference is extracted as a number of dots of the width or the height. The calibration data c1 of FIG. 27 includes a plurality of rectangles having the same N value. Therefore, the correction value generation unit 18 may perform matching on a plurality of rectangles having the same N value, extract the respective differences, and calculate an average value of the group of differences (hereinafter, "difference value").

Next, the correction value generation unit 18 calculates the correction value based on the extracted difference value, and stores the correction value in the correction value storage unit 123 (step S404).

FIG. 29 illustrates a configuration example of the correction value storage unit 123. As illustrated in FIG. 29, the correction value storage unit 123 stores a correction value (number of dots after printing), for each width or height (number of dots) before correction. The width or height before correction is the width or height of each rectangle in the calibration data c1.

That is to say, in FIG. 29, M indicates the number of dots of the basic unit. The correction value is obtained by adding the difference value to the value before correction. For example, 3M+1 (dots) with respect to 3M dots indicates that the 3M dots in the calibration data c1 tend to be printed as 3M+1 dots.

In the third embodiment, for example, when rendering a corrected barcode (step S116 of FIG. 6), and when rendering a corrected two-dimensional code (step S216 of FIG. 16), the correction value stored in the correction value storage unit 123 is used.

Specifically, the corrected code render unit 15 searches for a value matching the width or height of the rectangle that is the render target, from the correction values in the code information extraction unit 12. When a corresponding correction value is found as a result of the search, the corrected code render unit 15 refers to the value before correction with respect to the correction value, and renders the value before correction as the width or height of the render target. For example, it is assumed that the width or height of the rectangle that is the render target is 3M+1. In this case, the corrected code render unit 15 renders the width or height of the rectangle as 3M. Accordingly, when the corrected barcode or corrected two-dimensional code is printed, the corrected barcode or corrected two-dimensional code is rendered as 3M+1, so that the expected print results are obtained.

As described above, according to the third embodiment, by using a correction value based on the difference between the calibration data c1 and the print result, it is possible to correct the size (width or height) when rendering the corrected barcode or corrected two-dimensional code. That is to say, it is possible to correct the process of rendering the corrected barcode or corrected two-dimensional code in accordance with the printer 20 and properties of the print sheet. As a result, it is possible to further reduce the possibility of an error being included in the printed barcode or two-dimensional code.

Note that the present embodiment is also effective in, for example, printing document data via a cloud environment. That is to say, when printing is performed via a cloud environment, when generating document data, the printer to be the output destination is not specified. Therefore, there is an even higher chance that the resolution of the barcode or the two-dimensional code included in the document data being different from the resolution of the printer that is selected as the output destination. In such circumstances, by applying the present embodiment, it is possible to increase the possibility that a barcode or a two-dimensional code without any errors is printed.

According to an aspect of the embodiments, it is possible to reduce the possibility of an error being included in a coded image included in image data.

The present invention is not limited to the specific embodiments described herein, and variations and modifications may be made without departing from the spirit and scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image generating method performed by a computer, comprising:
   determining a code area in which a density of an assembly of linear lines, where midpoints are continued, exceeds a threshold in a midpoint image plotting each midpoint of black dots that are continuously arranged in first image data including a first coded image corresponding to data;
   acquiring the data corresponding to the first coded image based on the code area;
   generating, based on the acquired data, a second coded image, wherein a size of a configuration element is an integral multiple of a dot size of the first image data; and
   generating second image data indicating the generated second coded image.

2. An information processing method executed by a computer, comprising:
   extracting information indicated by a first coded image representing a first barcode or a first two-dimensional code, from electronic data including the first coded image corresponding to data as a render element;
   determining a code area in which a density of an assembly of linear lines, where midpoints are continued, exceeds a threshold in a midpoint image plotting each midpoint of black dots that are continuously arranged in first image data including the first coded image corresponding to the data;
   acquiring the data corresponding to the first coded image based on the code area;
   removing the first barcode or the first two-dimensional code from the electronic data;
   generating, based on the acquired data, a second coded image representing a second barcode or a second two-dimensional code, in which a size of a configuration element is an integral multiple of a dot size of the first image data; and
   rendering the generated second coded image in the electronic data.

3. The information processing method according to claim 2, wherein
   the extracting includes extracting configuration information of the first coded image,
   comparing the extracted configuration information with configuration information of a barcode or a two-dimensional code stored in a storage unit according to a specification of the barcode or the two-dimensional code, and determining a specification of the first coded image, and
   extracting the information indicated by the first coded image based on the determined specification.

4. The information processing method according to claim 2, wherein
   the rendering includes correcting the size that is an integral multiple of the value, by referring to a correction value storage unit storing dot numbers after printing for each of a plurality of different dot numbers, and
   rendering the configuration element of the second coded image by the corrected size.

5. A non-transitory computer-readable recording medium storing a program that causes a computer to execute a process comprising:

extracting information indicated by a first coded image representing a first barcode or a first two-dimensional code, from electronic data including the first coded image corresponding to data as a render element;
determining a code area in which a density of an assembly of linear lines, where midpoints are continued, exceeds a threshold in a midpoint image plotting each midpoint of black dots that are continuously arranged in first image data including the first coded image corresponding to the data;
acquiring the data corresponding to the first coded image based on the code area;
removing the first barcode or the first two-dimensional code from the electronic data;
generating, based on the acquired data, a second coded image representing a second barcode or a second two-dimensional code, in which a size of a configuration element is an integral multiple of a dot size of the first image data;
rendering the generated second coded image in the electronic data.

6. The non-transitory computer-readable recording medium according to claim 5, wherein
the extracting includes extracting configuration information of the first coded image,
comparing the extracted configuration information with configuration information of a barcode or a two-dimensional code stored in a storage unit according to a specification of the barcode or the two-dimensional code, and determining a specification of the first coded image, and
extracting the information indicated by the first coded image based on the determined specification.

7. The non-transitory computer-readable recording medium according to claim 5, wherein
the rendering includes correcting the size that is an integral multiple of the value, by referring to a correction value storage unit storing dot numbers after printing for each of a plurality of different dot numbers, and
rendering the configuration element of the second coded image by the corrected size.

* * * * *